United States Patent [19]
Movshovich

[11] Patent Number: 6,072,462
[45] Date of Patent: Jun. 6, 2000

[54] TECHNIQUE FOR GENERATING ON-SCREEN DISPLAY CHARACTERS USING SOFTWARE IMPLEMENTATION

[75] Inventor: Aleksandr Movshovich, Santa Clara, Calif.

[73] Assignee: Zilog, Inc., Campbell, Calif.

[21] Appl. No.: 08/688,426

[22] Filed: Jul. 30, 1996

Related U.S. Application Data

[63] Continuation of application No. 08/397,718, Mar. 2, 1995, Pat. No. 5,608,425, which is a continuation of application No. 08/114,657, Aug. 31, 1993, abandoned.

[51] Int. Cl.[7] .................................................. G09G 5/22
[52] U.S. Cl. ............................................ 345/141; 345/112
[58] Field of Search .................................. 345/141, 128, 345/112; 395/113, 134, 166, 143; 348/510, 563, 567

[56] References Cited

U.S. PATENT DOCUMENTS

| | | | |
|---|---|---|---|
| 4,097,367 | 6/1978 | Yonezawa | 345/141 |
| 4,107,786 | 8/1978 | Masaki | 345/128 |
| 4,346,407 | 8/1982 | Baer | 348/510 |
| 4,425,581 | 1/1984 | Schweppe | 348/510 |
| 4,554,582 | 11/1985 | Wine | 348/510 |
| 4,616,261 | 10/1986 | Crawford | 348/563 |
| 4,622,589 | 11/1986 | Bell . | |
| 4,626,837 | 12/1986 | Priestley | 348/510 |
| 4,631,702 | 12/1986 | Korba | 364/716.5 |
| 4,654,708 | 3/1987 | de la Guardia | 348/510 |
| 4,677,484 | 6/1987 | Pitsch et al. . | |
| 4,701,744 | 10/1987 | DeVilbiss . | |
| 4,760,391 | 7/1988 | Gries . | |
| 4,795,949 | 1/1989 | Wilber . | |
| 4,819,164 | 4/1989 | Branson | 364/DIG. 1 |
| 4,835,681 | 5/1989 | Culley | 364/DIG. 1 |
| 4,953,027 | 8/1990 | Tong et al. . | |
| 4,955,024 | 9/1990 | Pfeiffer et al. | 371/40.1 |
| 4,962,427 | 10/1990 | Lunn et al. . | |
| 4,962,428 | 10/1990 | Tong et al. . | |
| 4,981,296 | 1/1991 | Shiraishi | 364/270 |
| 5,119,200 | 6/1992 | van den Hombergh . | |
| 5,159,665 | 10/1992 | Priem | 345/434 |
| 5,181,113 | 1/1993 | Chang | 348/468 |
| 5,185,603 | 2/1993 | Medin . | |
| 5,202,669 | 4/1993 | Ishimochi . | |
| 5,521,614 | 5/1996 | Kotha et al. | 345/128 |
| 5,608,425 | 3/1997 | Movshovich | 345/141 |

OTHER PUBLICATIONS

"Digital Television Controller," Zilog, Inc. User's Manual, pp. 1–1 through 7–2, (Copyright 1993).

Staudgaard, A., "6809 Microcomputer Programming & Interfacing with Experiments," Howard W Sams & Co., Indianapolis, 1981, pp. 107–110 & 219.

Tandy, "TRS–80 Color Computer Technical Reference Manual," Ft. Worth, 1981, pp. 8, 16–23, 28–29 and 64–69.

*Primary Examiner*—Amare Mengistu
*Attorney, Agent, or Firm*—Majestic, Parsons, Siebert & Hsue

[57] ABSTRACT

A method for generating a video character in an on-screen display system. The method uses a HALT signal provided to the microprocessor which allows the microprocessor to finish executing its current instruction, but prohibits the microprocessor from beginning a next instruction. After a sufficient amount of time has passed to ensure that the microprocessor has completed its current instruction, an OSD interrupt signal is sent to the microprocessor instructing the microprocessor to begin OSD operations. Alternatively, the method uses a bus multiplexer which duplicates character data and sends the expanded data to a bus in order to enlarge characters displayed on the screen.

22 Claims, 18 Drawing Sheets

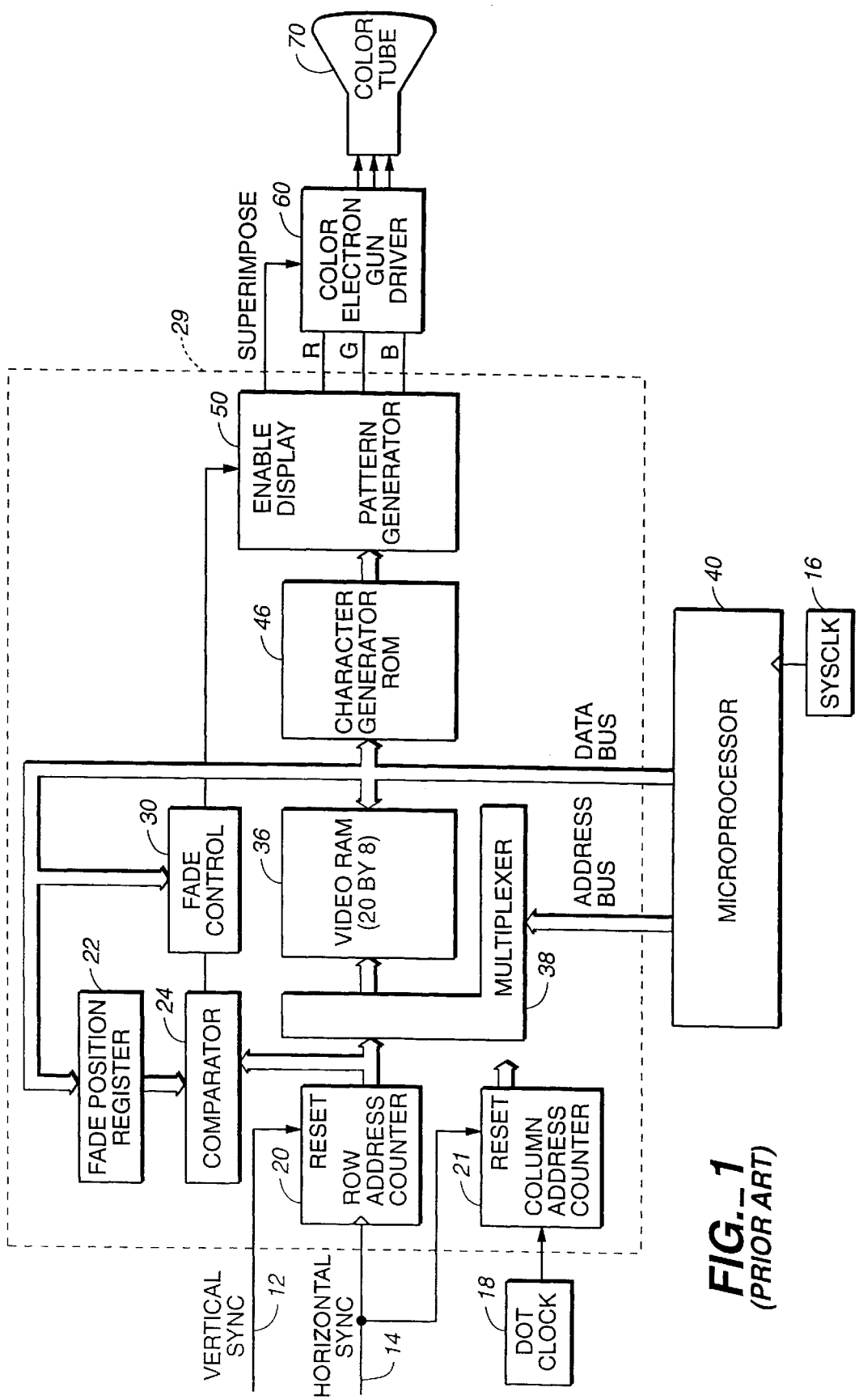
FIG._1
(PRIOR ART)

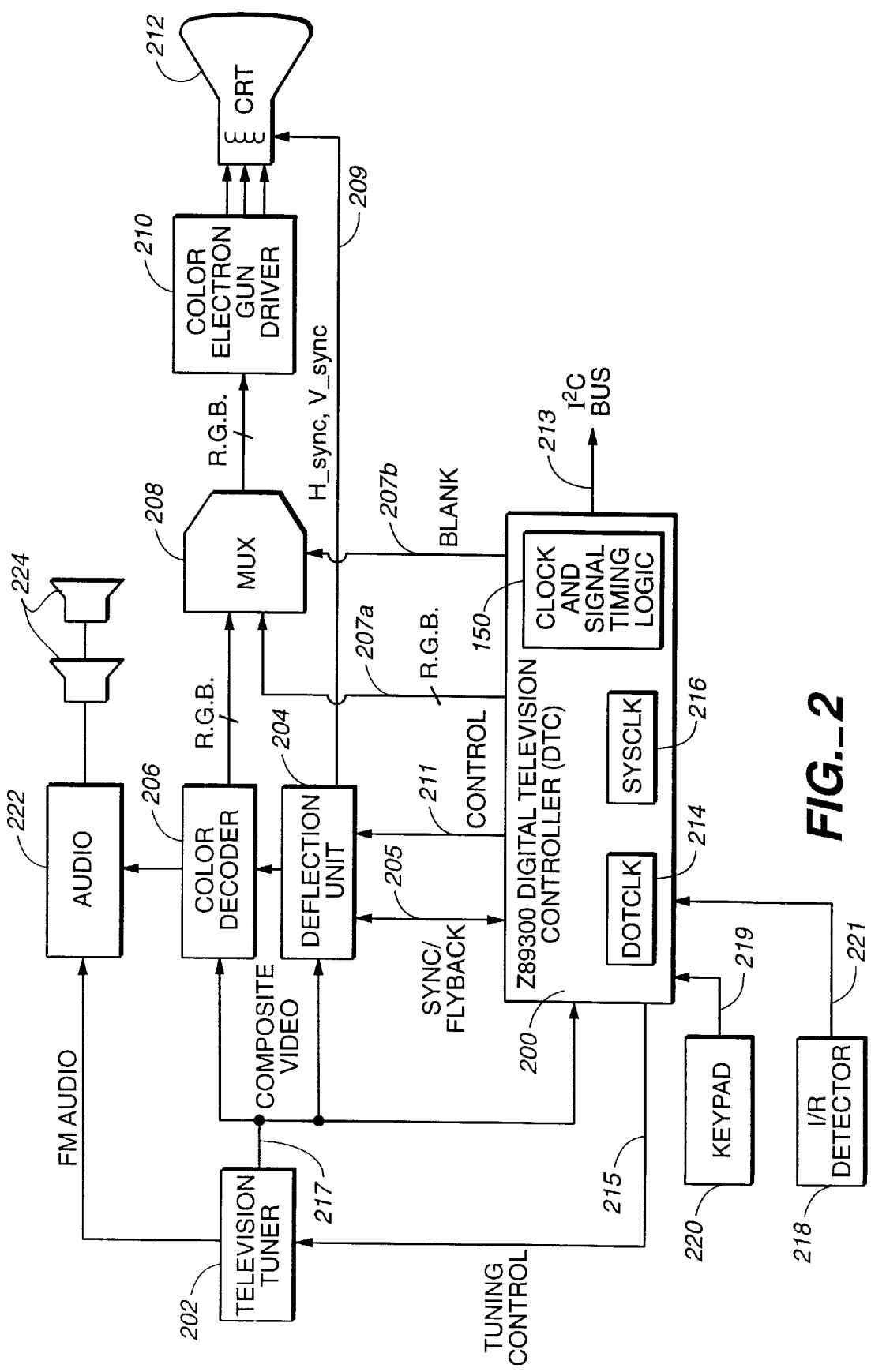
FIG._2

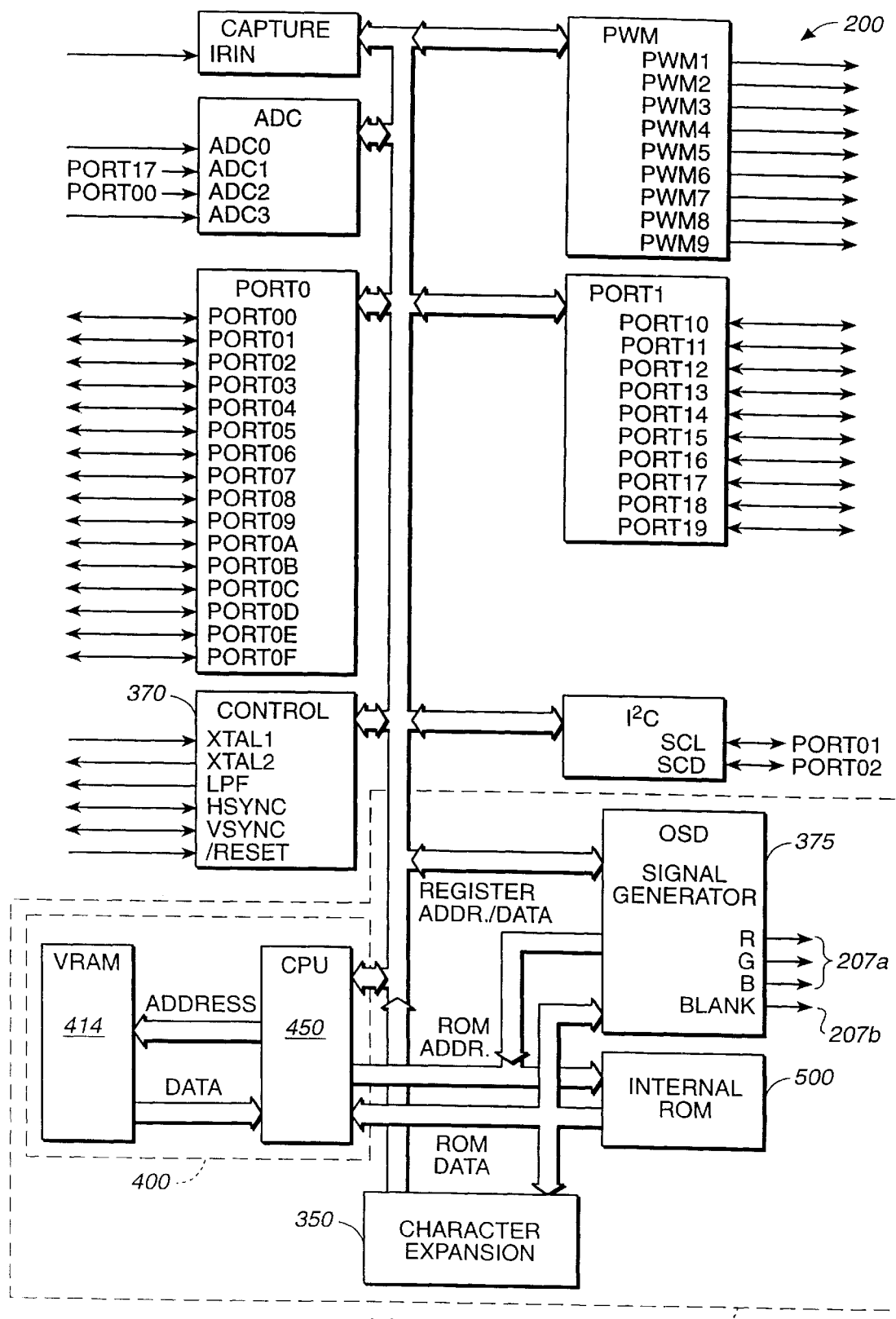
FIG._3

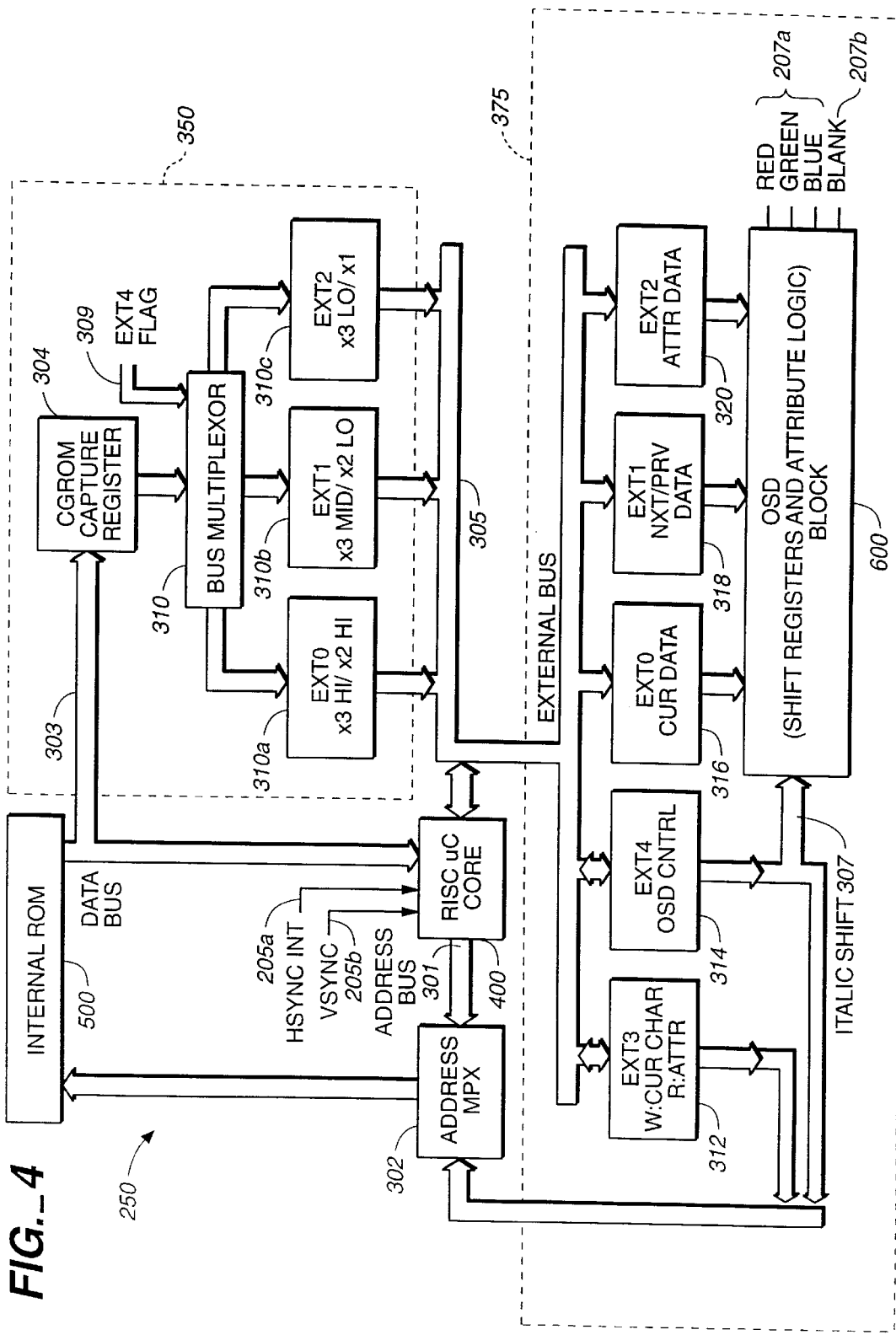
FIG._4

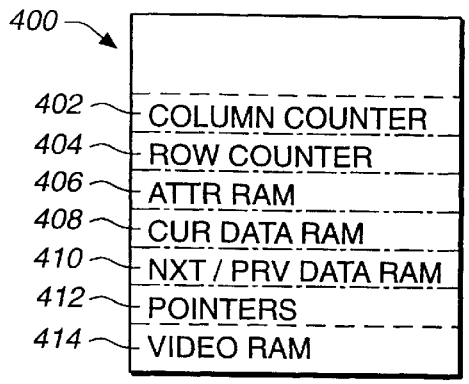
FIG._5A
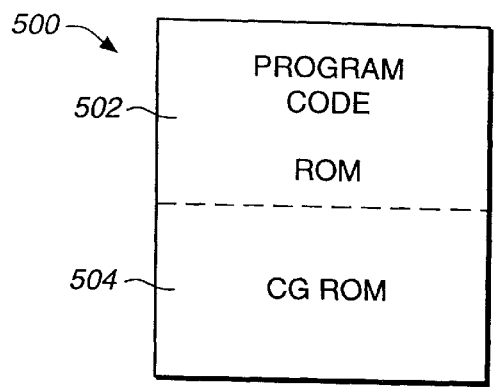
FIG._5B
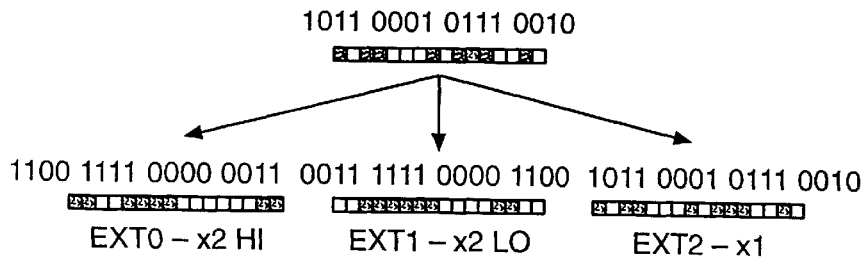
FIG._7A
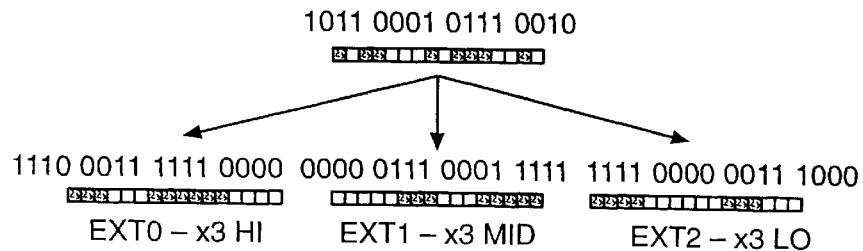
FIG._7B
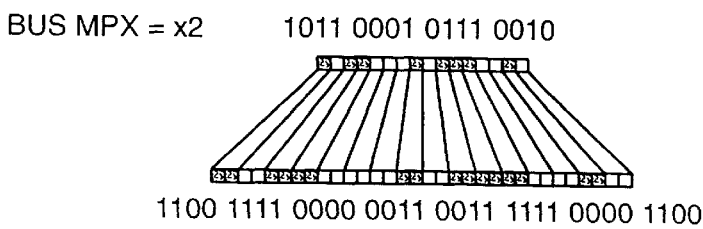
FIG._7C
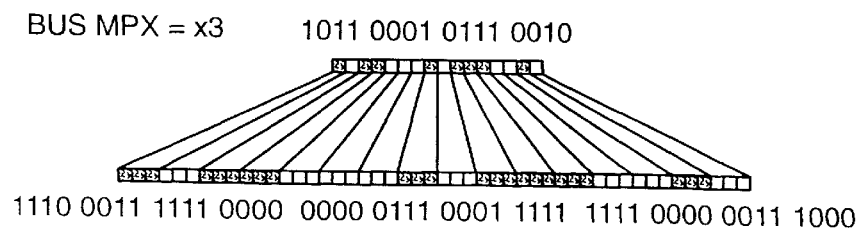
FIG._7D

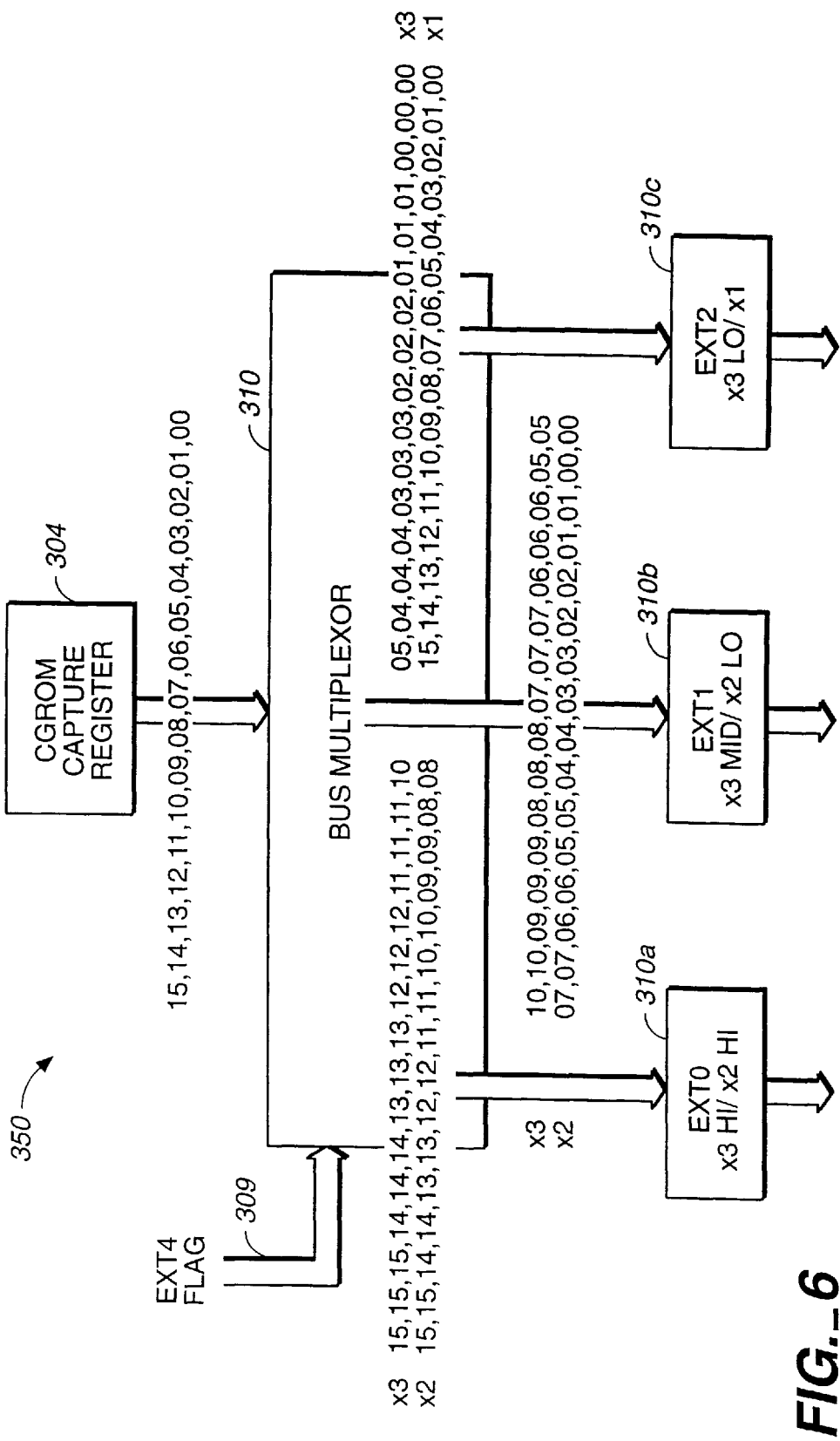
FIG._6

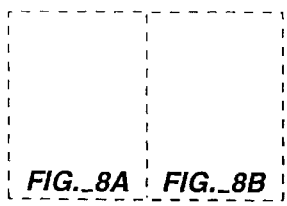
FIG._8
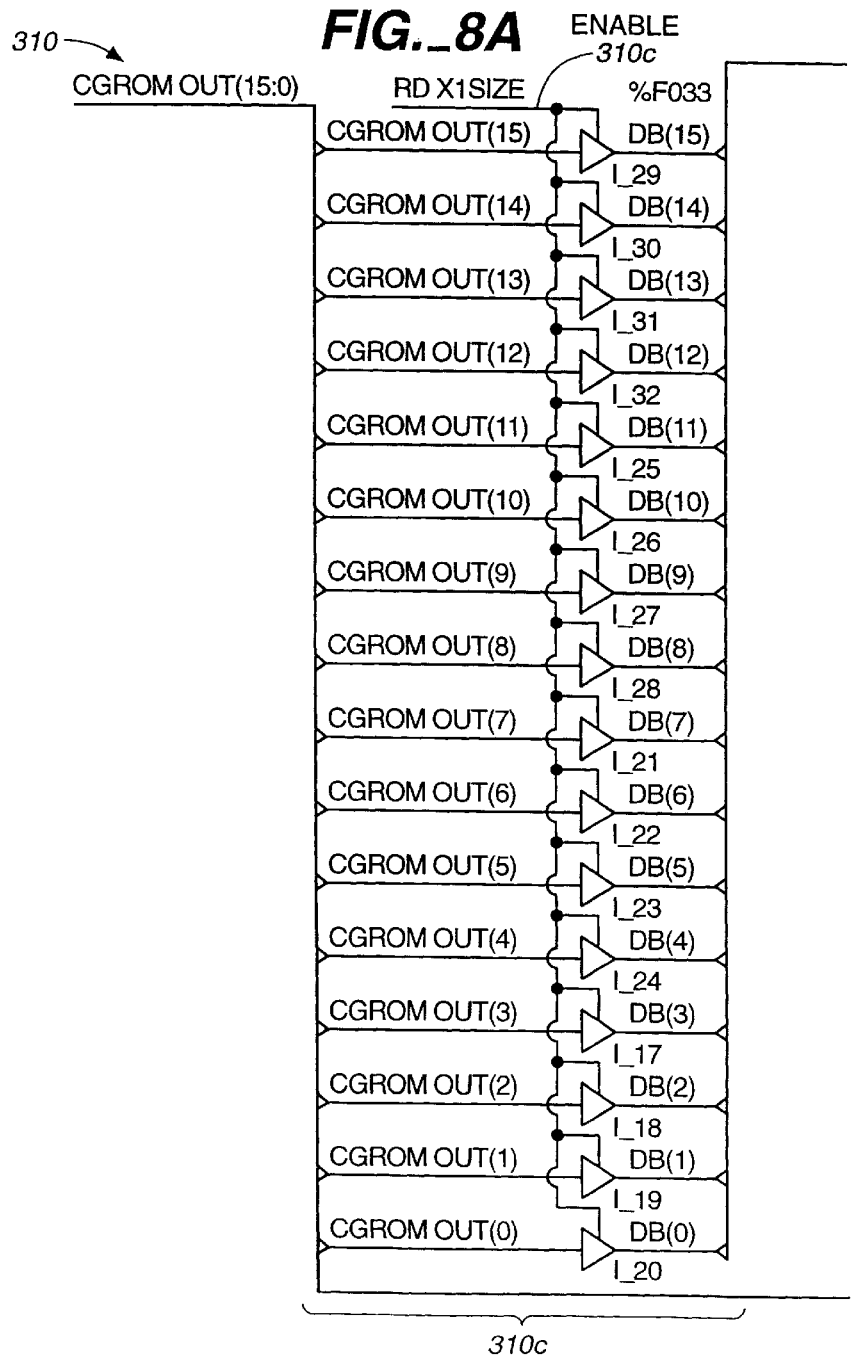

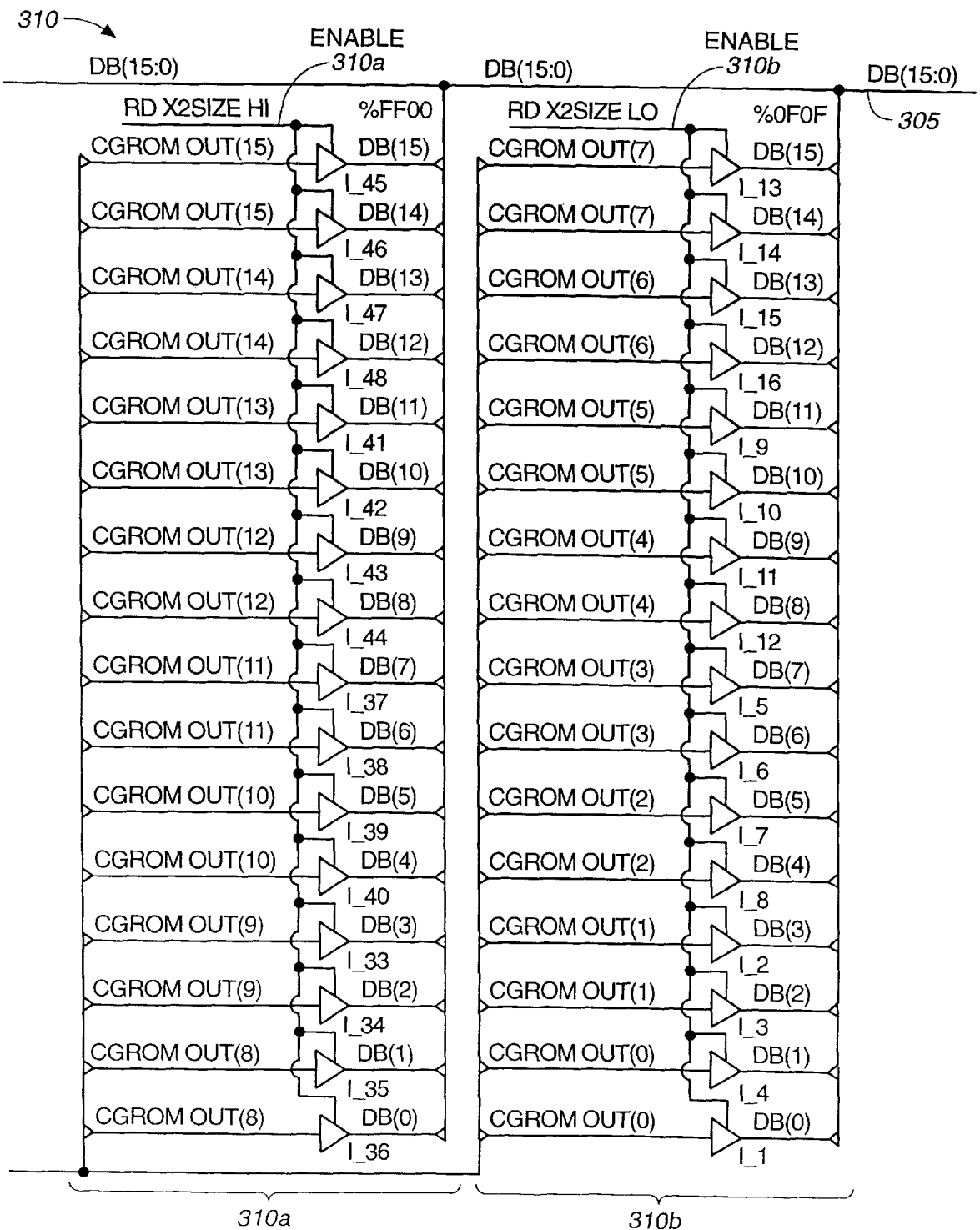
FIG._8B

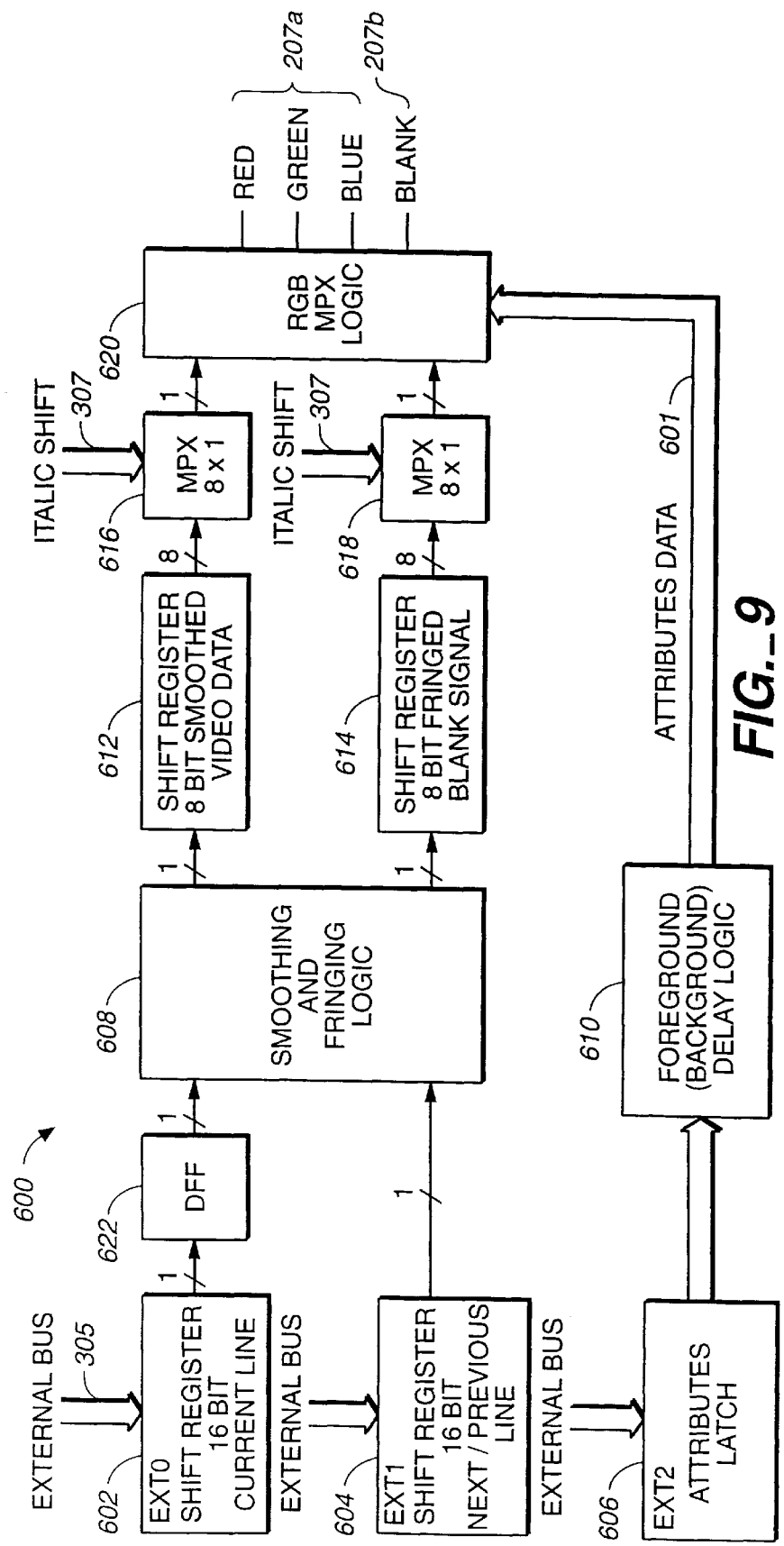
FIG._9

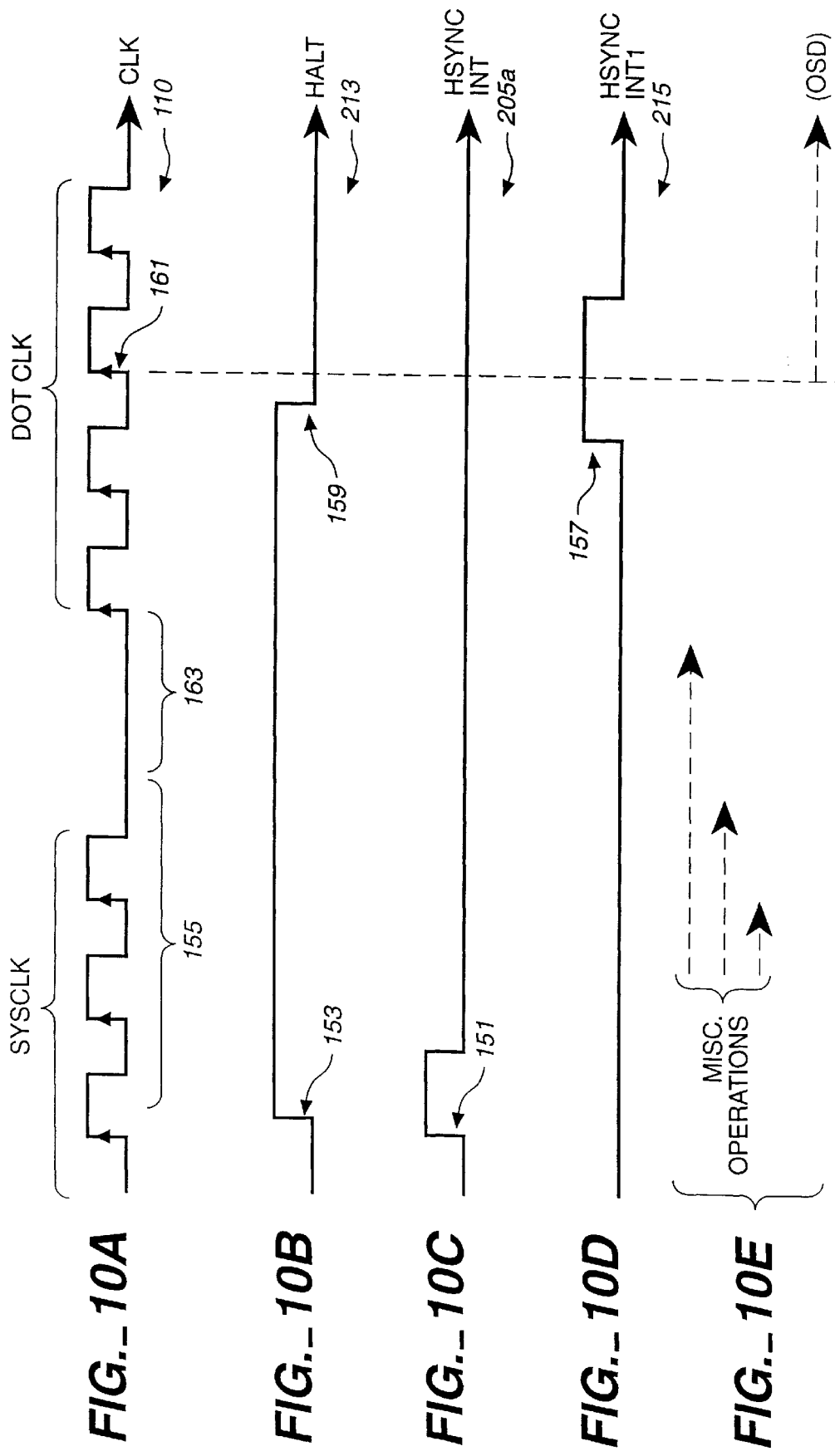

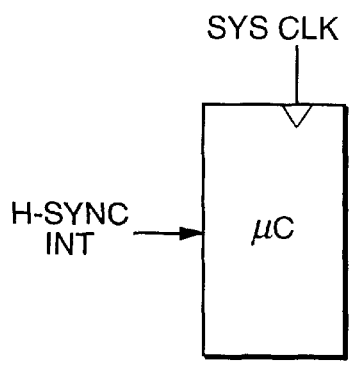
FIG._11
(PRIOR ART)
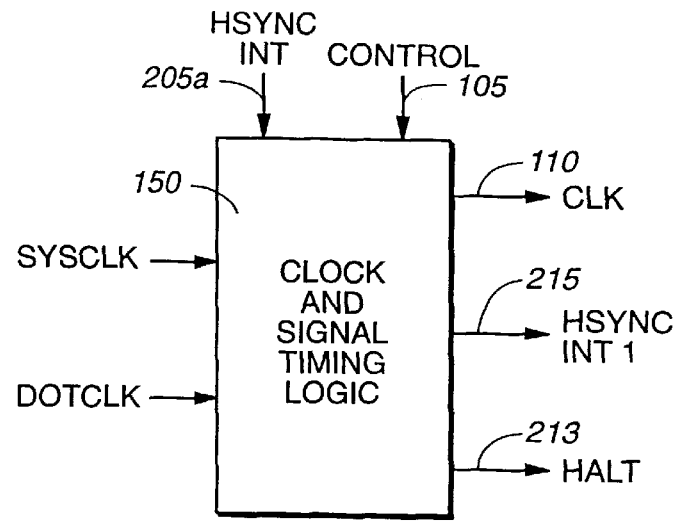
FIG._12
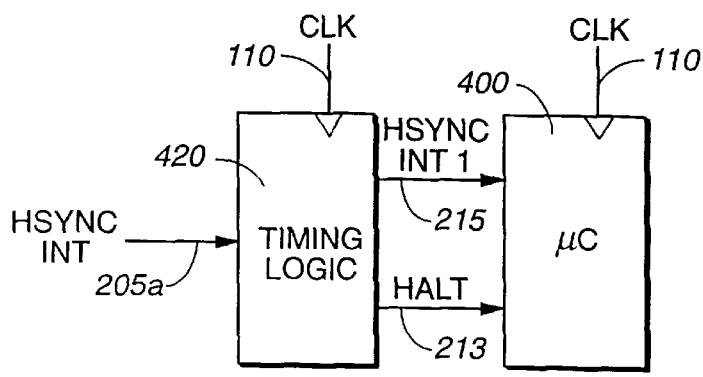
FIG._13A
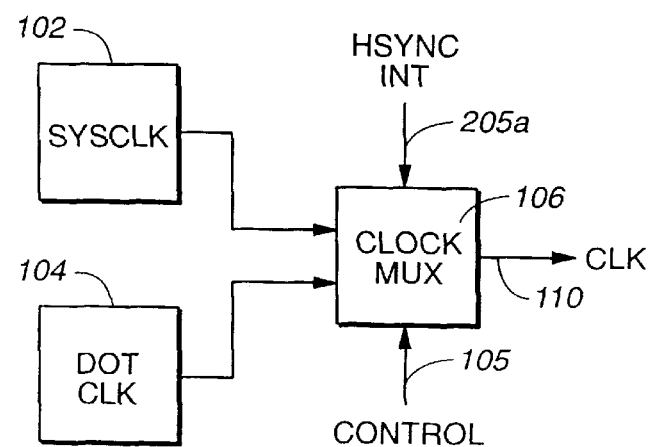
FIG._13B

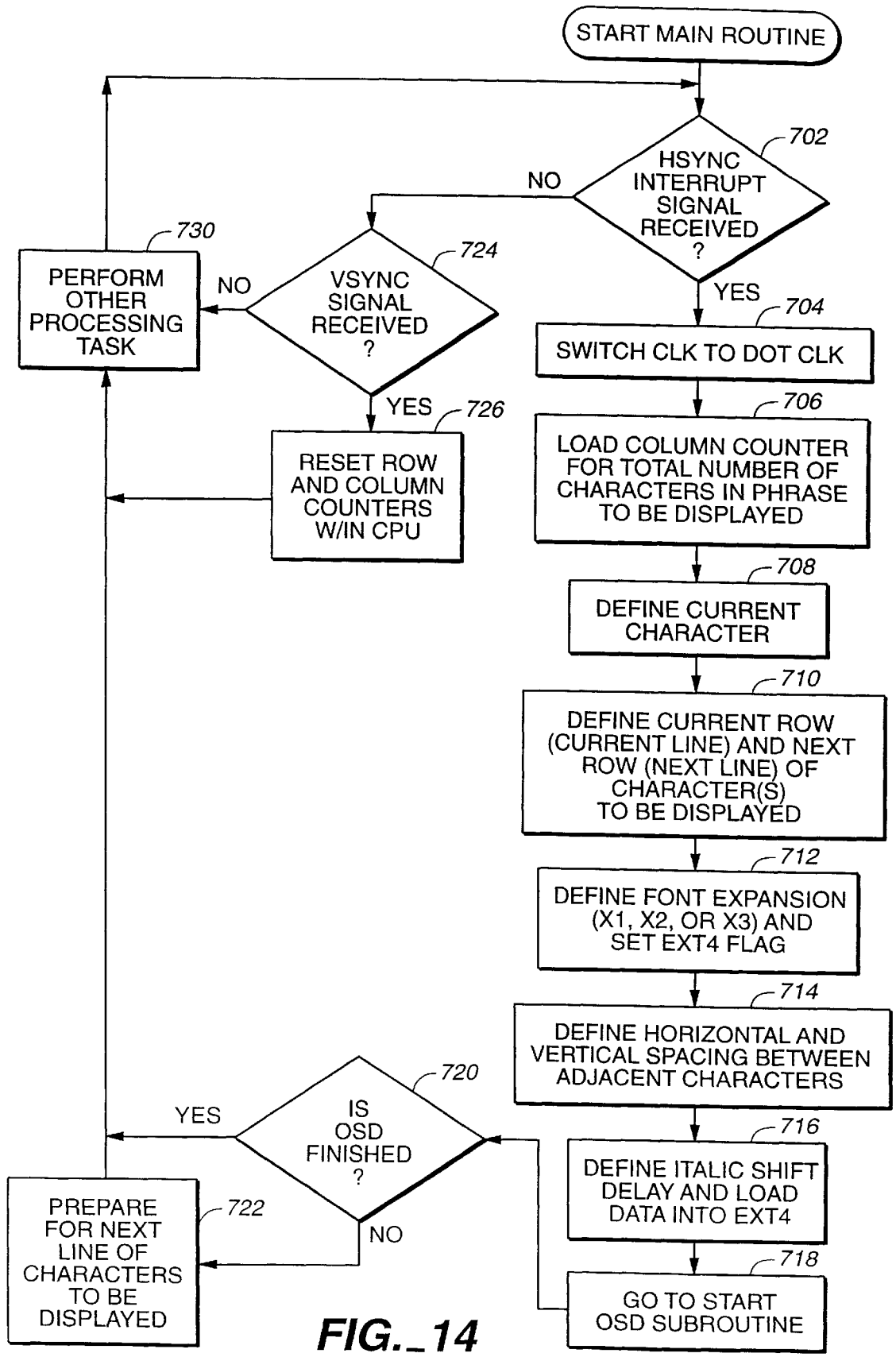
FIG._14

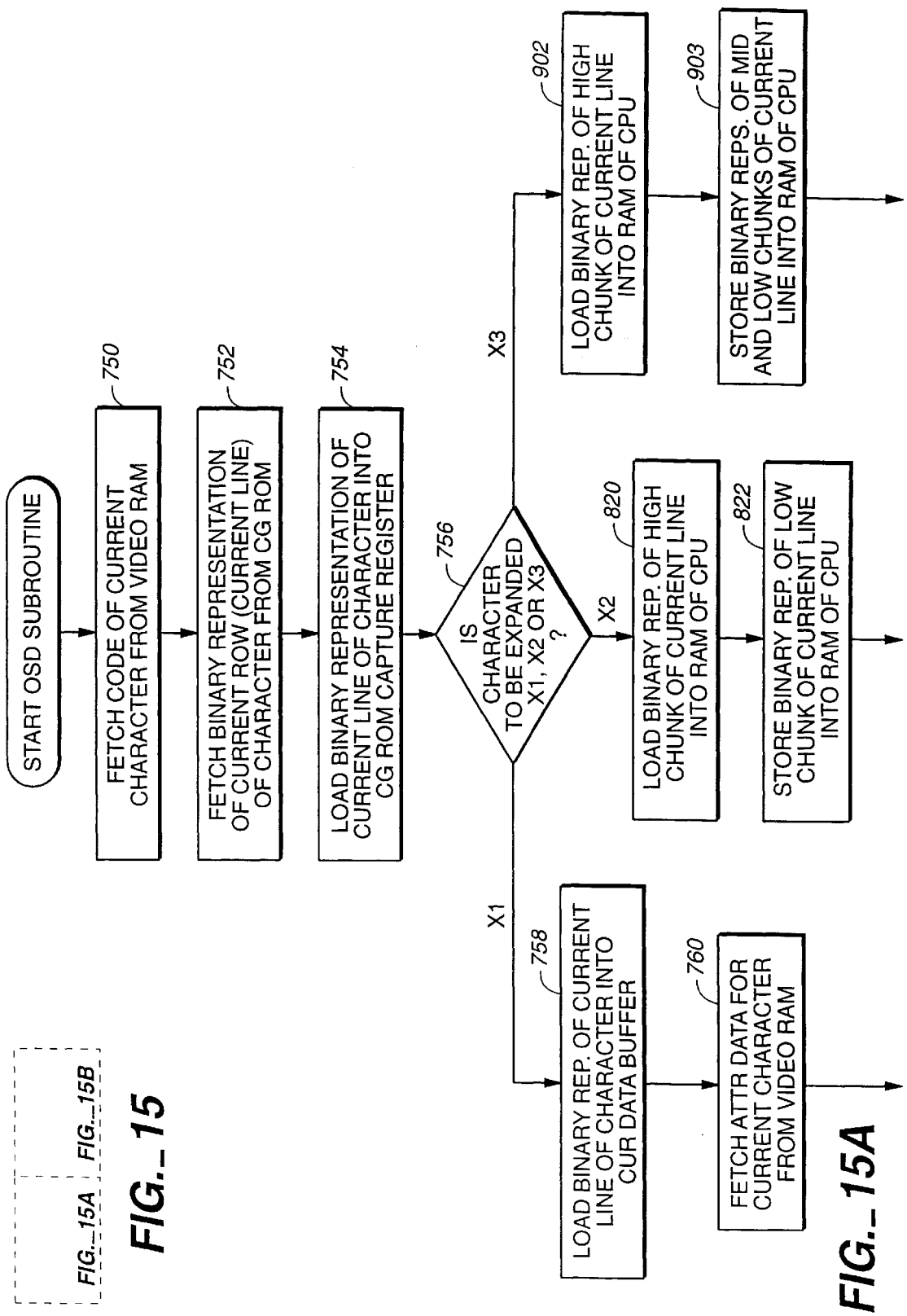
FIG._15

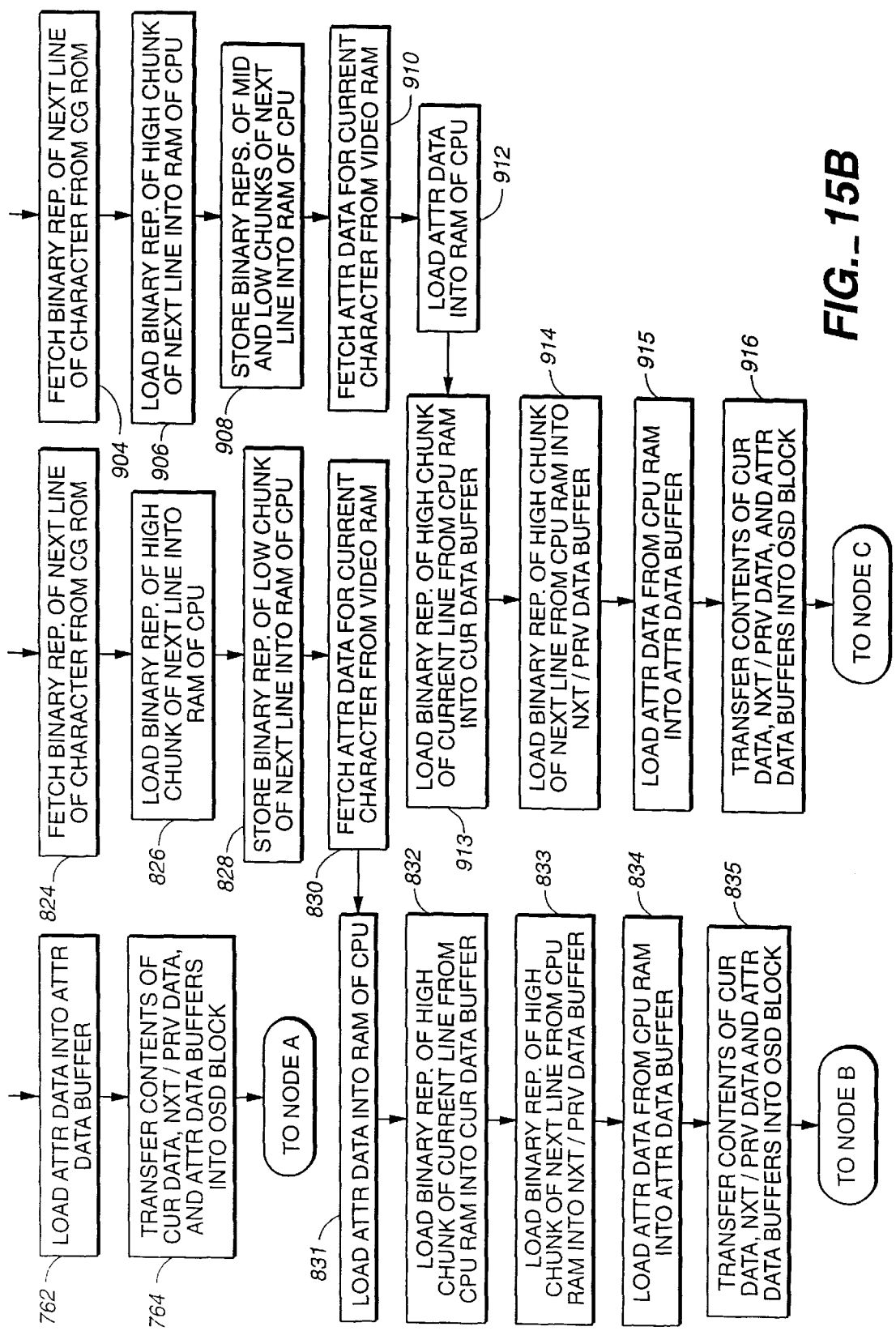
FIG._15B

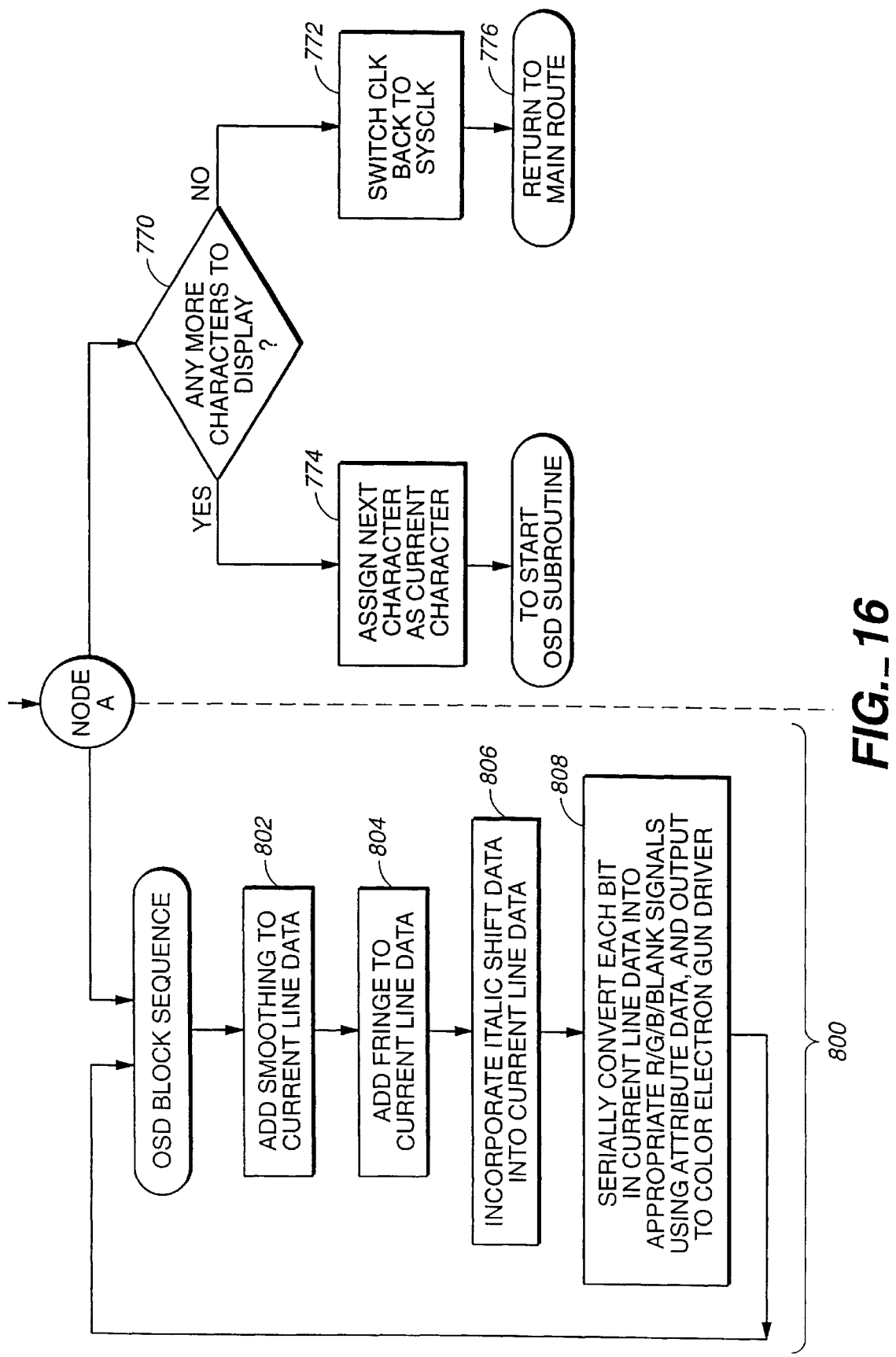
FIG._16

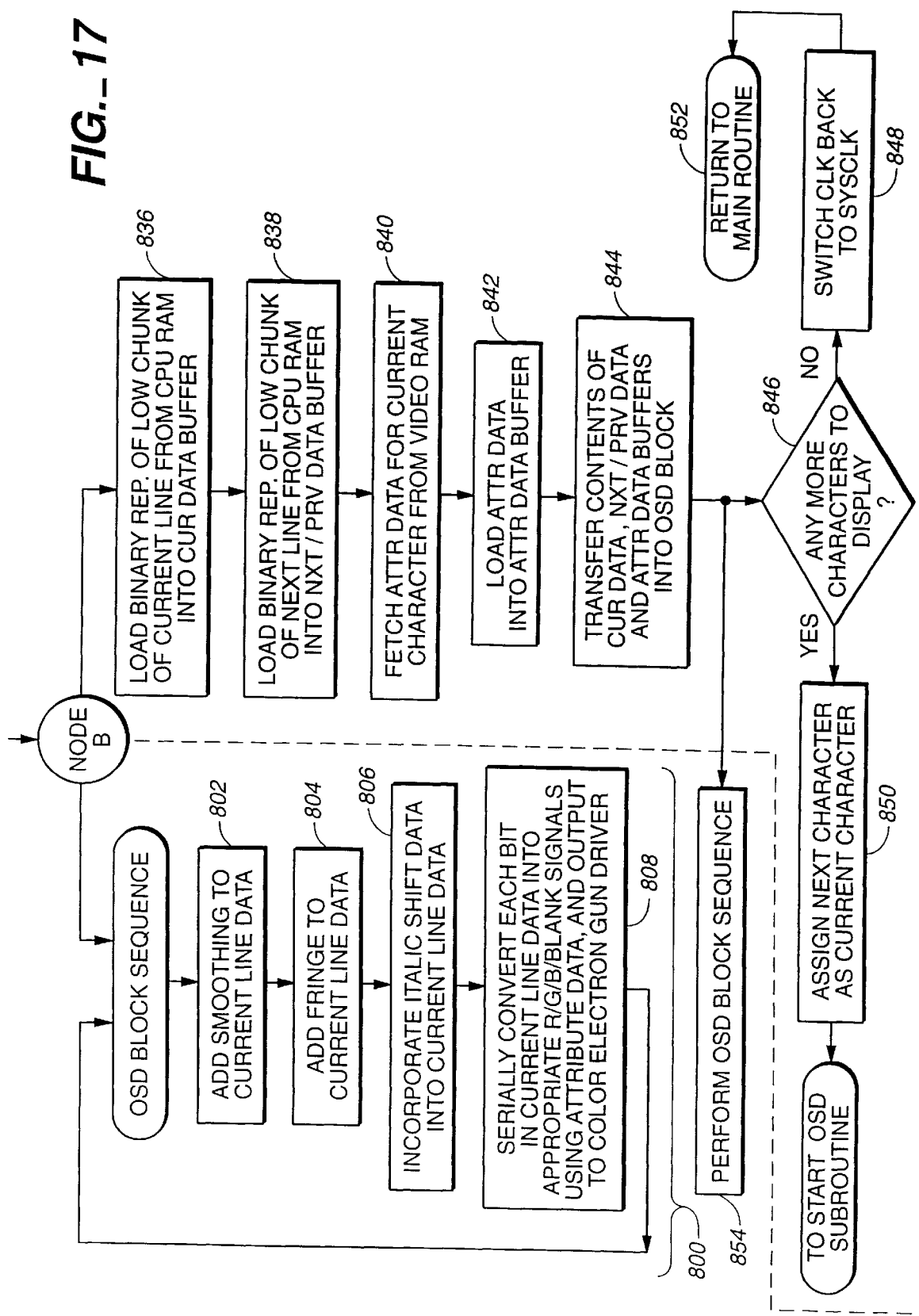
FIG._17

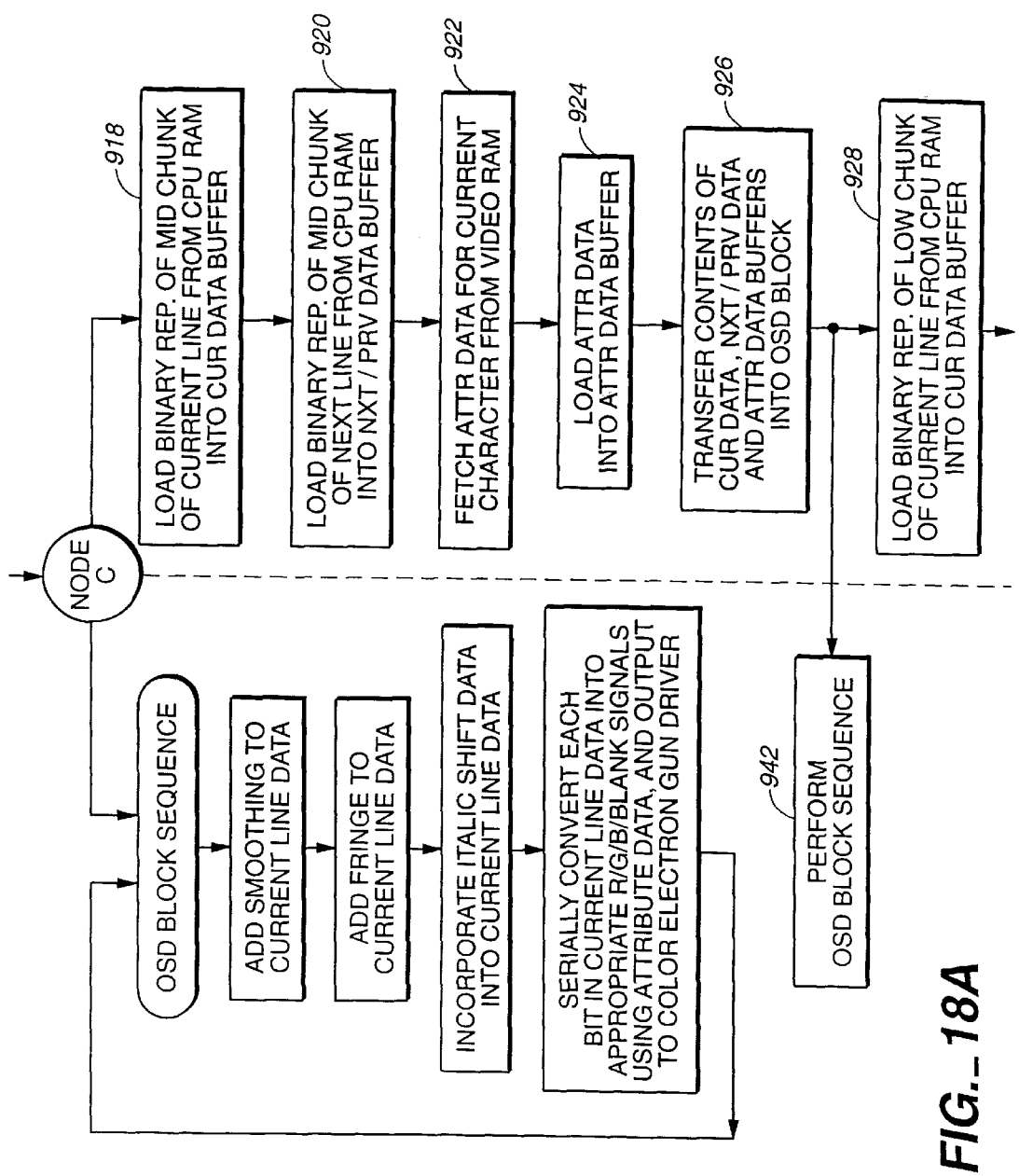
FIG._18A
FIG._18

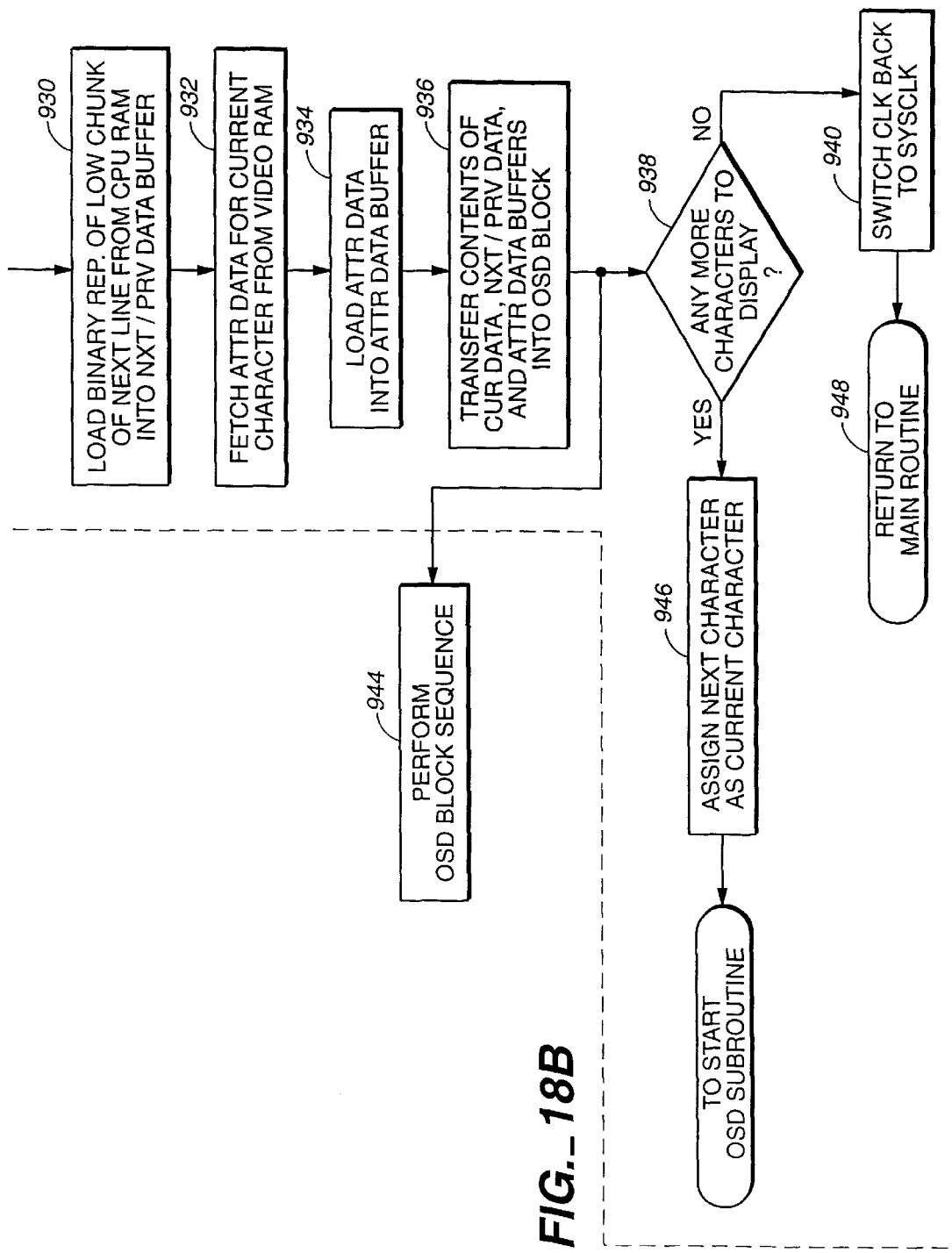
FIG._18B

TECHNIQUE FOR GENERATING ON-SCREEN DISPLAY CHARACTERS USING SOFTWARE IMPLEMENTATION

This is a continuation of application Ser. No. 08/397,718, which was filed Mar. 2, 1995 and is now U.S. Pat. No. 5,608,425, which in turn is continuation of parent application Ser. No. 08/114,657, which had been filed Aug. 31, 1993 and had been abandoned.

FIELD OF THE INVENTION

This invention relates in general to on-screen display (OSD) controllers, and more specifically to a new technique for generating on-screen display characters using primarily software implementation and a minimum of hardware.

BACKGROUND OF THE INVENTION

Many color television receivers include on-screen display circuitry for displaying video characters on a television screen. For example, the channel number can be displayed so that a viewer can readily verify to which channel the receiver is tuned. Such displays are typically generated by replacing normal video information with appropriately synchronized character signals developed by an alpha-numeric character generator ROM (CG ROM) in the receiver, so that the character information is displayed on a given portion of the television (or kinescope screen). The information displayed can include time of day information as well as channel information, for example, by employing appropriate electronic control circuits in the receiver. Examples of on-screen character display systems are found in U.S. Pat. No. 3,984,828, inventor Beyers; U.S. Pat. No. 4,354,202, inventor Harlan; and U.S. Pat. No. 5,150,107, inventor Kurisu.

As discussed in Kurisu, a summary of the television transmission process will now be described. A linear scanning process is used to break down a television picture for transmission. The image information in the resulting video signal is used at the receiver to control an electron gun in a kinescope, where the gun sweeps across a screen along nearly horizontal parallel lines that together make up the television picture.

When the video signal is processed at the receiver, it requires a means of synchronizing with the televised scene exactly as scanned by the transmitter camera tube. The speed of the receiver scanning line must duplicate that of the transmitter scanning line so that the top of the scene appears at the top of the screen and not elsewhere. When the horizontal beam reaches the end of the bottom line of the televised scene, it must retrace back to the beginning of the top line without being seen, simultaneously at both transmitter and receiver. During the retrace, the electron beam at the receiver must be blanked off (turned off) by a high amplitude signal that turns off the electron gun while the scanning circuits retrace the beam. The electron gun is similarly turned off during the vertical retrace, although for a longer time interval.

The scanning process requires means of coordinating the transmitter and receiver. To accomplish this objective, the transmission system generates synchronized signals to be used by the receiver so that it stays in steps with the transmitter. Two sets of synchronization signals are transmitted—horizonal (HSYNC) pulses and vertical (VSYNC) pulses. During each horizonal retrace, a HSYNC pulse is transmitted which is not seen on the screen since the beam is turned off. Similarly, the VSYNC pulse transmitted during each vertical retrace is not visible.

Conventional OSD System Architecture

The conventional on-screen display system is depicted in FIG. 1. The system comprises a microprocessor 40 and an on-screen display (OSD) logic circuit 29 which is hardwired to operate independently of the microprocessor 40 once the microprocessor has fed the initial video data into the OSD circuitry. The independence of the OSD circuitry 29 is attributable to the fact that the OSD circuitry 29 is designed specifically for the purpose of displaying video characters on the television screen, whereas the microprocessor is utilized by the television to perform primarily non-OSD related tasks. Thus, while the OSD circuitry is manipulating the video data to display it on screen, the microprocessor is free to perform other essential processing tasks which are not related to the OSD operations.

Conventional OSD Synchronization

One common problem associated with character OSD is the synchronization between the OSD circuits and the electron gun which uses the video data from the OSD circuitry to project characters on the color tube 70. For example, in a television screen 300 pixels wide by 400 pixels high, the electron gun horizontally scans across each row of pixels at a rate of about 3.6 million pixels per second. For each pixel the electron beam scans across, the color electron gun driver must position the beam to illuminate the appropriate red/green/blue (RGB) parts of the pixel. The determination of which RGB parts of each pixel to illuminate is based upon the data provided by the OSD circuitry 29.

As can be seen in FIG. 1, it is the OSD circuitry 29 which actually determines the appropriate RGB signals to be sent to the color electron driver. The color electron gun driver 60 operates in real-time, meaning that it continuously directs the electron beam across each pixel in the color tube, illuminating the appropriate RGB parts of each pixel as directed by the OSD circuitry 29. Thus, once the driver receives the RGB data, it immediately redirects the electron beam to illuminate the appropriate RGB parts of the pixels it is scanning across. The driver will continue to illuminate those RGB parts for each pixel it scans across until new RGB data has been received from the OSD circuitry 29.

The reason for needing to synchronize the OSD circuitry with the electron gun driver is that the data provided by OSD circuitry 29 must be in sync with the color electron driver's positioning of the electron beam in order to ensure that a stable character is displayed on the color tube 70. If the data provided by the OSD circuitry 29 is not in sync with the color electron driver 60, the resulting characters displayed to the viewer will appear to shake or jitter or otherwise be unstable. This is due to the fact that the electron beam in the color tube constantly scans across each row of horizonal pixels at a rate of about 15.75 KHz, which means that about 30 times a second the characters provided by OSD circuitry 29 are redisplayed on the picture tube. If the data provided by the OSD circuitry 29 is transmitted to the color electron gun driver too early, the character displayed on the screen will appear to shift to the left. If the data from the OSD circuitry 29 is transmitted to the driver too late, the characters generated will appear to the shift to the right. This shifting left and right is observed by the viewer as jitter. Therefore, in order to ensure that the appropriate RGB part of each pixel is illuminated as the beam scans across it, it is essential that the RGB data provided by the OSD circuitry 29 be synchronized with the driver such that the appropriate RGB pixel data is provided to the driver at the precise moment when the electron beam is scanning across the particular pixel of the color tube to which the RGB data relates.

In order to achieve this synchronization, each component within the OSD circuitry 29 is driven by a DOT clock signal provided by the DOT clock oscillator 18. The DOT clock oscillator 18 is designed to have a frequency which is equal to the rate at which the electron beam scans across each pixel in the color tube 70 (i.e. the pixel rate). Thus, by synchronizing the DOT clock with the pixel rate, the data provided by the OSD circuitry 29 will be synchronized with the electron beam, thereby assuring that the character generated on the display is stable.

One advantage of connecting the OSD circuitry 29 to the DOT clock 18 is that the rest of the electronic circuitry within the television is able to operate independently of and typically at a different clock speed than the OSD circuitry 29. As shown in FIG. 1, conventional OSD systems include a microprocessor which is driven by a system clock (SYSCLK) signal 16. This SYSCLK signal frequency is typically different from the frequency of the DOT clock signal. For example, the frequency of the SYSCLK can be 4 MHz, whereas the frequency of the DOT clock is, for example, 6 MHz. Although the microprocessor is driven by the SYSCLK 16, the difference in timing between the SYSCLK and the DOT clock does not interfere with the stability of the characters displayed on the color tube 70. This is because the role of the microprocessor with respect to the OSD circuitry is very minor and does not need to be synchronized with the OSD circuitry 19 in order to provide for a stable character display.

Essentially, the microprocessor's role in conventional OSD systems is to load the appropriate character information to be displayed into the video RAM (VRAM) 36. After the microprocessor performs this operation, the OSD circuitry 29 works independently of the microprocessor to generate the characters displayed on the color tube 70. An example of the conventional OSD system operation is as follows.

Let us assume that the viewer has selected channel 4, and that the character "4" is to be displayed on the screen. Initially, the microprocessor will determine that the character "4" is to be displayed on the screen and place the appropriate character information into the video RAM. From that point, the microprocessor goes on to perform other processing tasks not related to the OSD sequence while the OSD hardware simultaneously and independently performs the necessary operations to cause the character "4" to be displayed on the TV screen.

After the character data has been placed into the video RAM, the hardware of the conventional OSD system uses this data to retrieve a binary representation (or bit mapped array) of the character "4" from the CG ROM. The OSD hardware causes the CG ROM to output each row (i.e. each horizontal slice) of the bit mapped array to the pattern generator. The pattern generator converts this bit mapped information into the appropriate RGB signals to be provided to the electron gun driver. Each bit of data in the bit mapped array corresponds to one or more pixels on the TV screen. As the RGB data is output to the electron gun driver 60, the appropriate RGB parts of each pixel in the tube 70 are illuminated. After the first row of the bit mapped array of the character "4" has been displayed, the other rows of the bit mapped array of the character "4" are each generated by the OSD hardware and displayed in the same manner, resulting in the complete character "4" being displayed on the TV screen.

Expanding the Width of Characters Displayed

Occasionally it is desired to alter the font of the character displayed, for example, by enlarging the font to enable viewers with visual impairment to more easily identify the channel selected. In conventional OSD systems, the altering of the font size of the characters displayed is accomplished by adjusting the frequency of the DOT clock which drives the OSD logic circuits 29. For example, to double the width of the characters displayed on the color tube, the frequency of the DOT clock 18 is cut in half. A brief explanation of the conventional technique for expanding the width of the characters displayed is as follows.

As discussed above, the rate of which data is provided by the OSD circuitry 29 to the electron gun driver 60 is the same rate in which the electron beam scans across each pixel in the color tube 70. The electron beam within the color tube 70 scans at a constant rate (i.e. the pixel rate), which is typically not adjustable. When the DOT clock is set to the same frequency as the pixel rate, a one-to-one mapping of the bit mapped array of the character is achieved. This means that each bit of RGB data output by the OSD logic circuit 29 corresponds to a particular pixel on the color tube 70.

However, when the frequency of the DOT clock is cut in half, while the pixel rate is kept constant, each bit of RGB data output from the OSD logic circuit 29 will correspond to two pixels on the color tube 70, thereby producing a one-to-two mapping of the bit mapped array of the character. Thus, in the example above, the number of pixels used to display the character "4" will be doubled when the frequency of the DOT CLOCK is cut in half, with the result that the viewer will perceive the character "4" as being twice as wide as the original character.

A more complete description of conventional OSD systems is described in *Digital Television Controller User's Manual*, published by Zilog, Inc., 1993 ("Zilog DTC Manual"), herein incorporated by reference. The Zilog DTC Manual describes many of the functions and operations of a conventional OSD system which are commonly known to those skilled in the art, and therefore will not be discussed further in this application.

Although conventional OSD systems have been modified over the years to produce visually pleasing display characters, each of the present day OSD systems suffer from a number of drawbacks. For example, one such drawback, as depicted in FIG. 1, is that the OSD circuitry 29 is almost exclusively hardware implemented. Generally, hardware implementation of circuitry is less flexible and more costly than software implementation since more components must be used to form the hardware logic circuits. In addition, subsequent problems, or bugs, detected in hardware circuits are costly to remedy since typically the circuit itself must be redesigned, manufactured, and reinstalled. In contrast, software implemented logic circuits are easier to debug and cost less to reprogram and install than functionally equivalent hardware logic circuits. Furthermore, hardware logic circuits cannot be easily modified to incorporate novel ideas and improvements, whereas software implemented logic circuits are easily reconfigured to incorporate novel approaches and improvements within software algorithms.

In light of these drawbacks, therefore, one objective of the present invention is to provide a new OSD system architecture which comprises a minimal amount of hardware components, and is primarily implemented by software. An additional objective of the present invention is to provide for a synchronization technique within the software driven OSD system in order to prevent on-screen display jitter. A third objective of the present invention is to provide a technique for altering the font size of the display characters without altering the frequency of the DOT clock.

SUMMARY OF THE INVENTION

These and additional objections are accomplished by the various aspects of the present invention, wherein, briefly, according to a principle aspect, a new technique for generating OSD characters is disclosed having a system architecture which utilizes a minimum of hardware and is primarily implemented through software. According to this principle aspect, the microprocessor of the present invention plays a much more active role in processing OSD data than do microprocessors of conventional OSD systems. Specifically, the technique of the present invention incorporates the use of a microprocessor which is utilized to store and transfer video data to and from a plurality of logic circuits which make up the OSD system.

In accordance with this principle aspect, a second aspect of the present invention is directed to a clock switching device which is connected to both the CPU and other logic circuits of OSD system. The switching device is responsive to at least one control signal for providing an output clock signal (CLK) which is switchable between two clock signals such as, for example, a DOT clock signal (DOTCLK) and a system clock signal (SYSCLK). One advantage of this switching device is that it can be used to ensure that the microprocessor is in sync with the OSD timing circuit during OSD operations. Another advantage of the switching device is that it allows the microprocessor to perform non-OSD operations at the SYSCLK frequency.

A third aspect of the present invention is directed to a technique for altering the font size of the characters displayed on the kinescope (or raster scanned image display) which is compatible with the new architecture of the present invention. Specifically, the present invention is able to expand the width of the various characters displayed on the screen without altering the frequency of the DOTCLK signal, as is done in conventional OSD systems.

A fourth aspect of the present invention is directed to a technique for synchronizing the microprocessor, the OSD logic circuit, and the color electron gun driver in order to avoid on-screen display jitter. This synchronization technique is accomplished through the use of a HALT signal provided to the microprocessor which allows the microprocessor to finish executing its current instruction, but prohibits the microprocessor from beginning a next instruction. After a sufficient amount of time has passed to ensure that the microprocessor has completed its current instruction, an OSD interrupt signal is sent to the microprocessor instructing the microprocessor to begin OSD operations.

The advantages of the present invention over conventional OSD systems are numerous. Since the present invention is primarily software implemented, it is simpler and cheaper to produce, smaller in size, and offers a greater amount of flexibility for subsequent improvements and innovations than conventional OSD systems.

Additional objects, features, and advantages of the various aspects of the present invention will become apparent from the following description of its preferred embodiments, which description should be taken in conjunction with the accompanying drawings.

BRIEF DESCRIPTION OF THE DRAWINGS

FIG. 1 is a block diagram of a conventional on-screen display system.

FIG. 2 is a block diagram of the present invention incorporated into circuitry of a conventional television system.

FIG. 3 is a functional block diagram illustrating the data and address paths of the various components within the digital television controller 200 of FIG. 2.

FIG. 4 is a block diagram of the hardware logic of the present invention, which depicted as OSD block 250 of FIG. 3.

FIG. 5A is an example of the RAM map within the microcontroller 400 of FIG. 4.

FIG. 5B illustrates the contents of the internal ROM block 500 of FIG. 4.

FIG. 6 is an illustration of the operation of the character expansion portion of the present invention, as depicted in block 350 of FIG. 4.

FIG. 7A illustrates the output of the bus multiplexer when the EXT4 flag is at a first value.

FIG. 7B illustrates the output of the bus multiplexer when the EXT4 flag is at a second value.

FIG. 7C illustrates the input and output of the bus multiplexer when the character is to be expanded by a factor of two.

FIG. 7D illustrates the input and output of the bus multiplexer when the character is to be expanded by a factor of three.

FIG. 8 is a schematic diagram of one embodiment of the bus multiplexer 310 of FIG. 6 where the binary input word is to be expanded by a factor of x1 and x2.

FIG. 9 is a block diagram of the OSD (shift register and attribute logic) block 600 of FIG. 4.

FIGS. 10A through 10E illustrate the various timing and operational signals of the present invention, and illustrate how each signal is interrelated to each other signal.

FIG. 11 illustrates an example of the conventional inputs to a microprocessor of a conventional OSD system.

FIG. 12 is an illustration of the clock and signal timing logic which is used to synchronize the OSD circuitry 250 of FIG. 4.

FIG. 13A is a block diagram of the microprocessor synchronization aspect of the clock and signal timing logic 150 of FIG. 12.

FIG. 13B is an illustration of the clock switching device of the clock and signal timing logic 150 of FIG. 12.

FIG. 14 is a flow diagram illustrating a number of the various steps which the microprocessor of the present invention is required to perform.

FIG. 15 is a flow diagram of the OSD subroutine block 718 of FIG. 14.

FIG. 16 is a flow diagram which is continued from block 768 of FIG. 15.

FIG. 17 is a flow diagram which is continued from block 834 of FIG. 15.

FIG. 18 is a flow diagram which is continued from block 916 of FIG. 15.

DETAILED DESCRIPTION OF THE PREFERRED EMBODIMENT

As discussed previously, the present invention relates to a new technique for generating characters on a raster scanned image display such as a television screen, CRT, or other kinescope device. The new technique of the present invention is implemented through the use of a new architecture for implementing on-screen display (OSD) characters. The new OSD architecture is primarily software driven and utilizes only a minimum amount of hardware. For convenience purposes, reference numbers for those elements which are common to each of the figures will remain the same.

FIG. 2 shows a typical application of the present invention as part of an imbedded controller 200 in a television receiver. Shown within the digital television controller 200 are a DOT clock source (DOTCLK), a system clock source (SYSCLK) 216, and clock and signal timing logic circuit 150, which is discussed in greater below in the section entitled, "Synchronization of OSD Circuitry".

The DTC controller 200 can operate in a number of different modes, one of which is a character control mode which provides maximum display control flexibility for controlling character attributes such as color, shading, fringing, etc. In the character control mode, the OSD circuitry 250 (FIG. 3) provides access to the full set of attribute controls. Such attribute controls are discussed in detail in the *Digital Television Controller Users Manual*.

A brief overview of the system of FIG. 2 will now be discussed. When a viewer decides to view a particular channel, he or she enters the channel number on the keypad 220 or on a remote control device which sends an infrared signal to the IR detector 218. The digital television controller 200 responds by tuning the television tuner 202 to the appropriate channel. The television tuner 202 separates the FM audio signal from the composite video signal, sending the FM audio signal to the audio processor 222, while the composite video signal is sent to the color decoder 206, the deflection unit 204, and the digital television controller 200. The function of the color decoder 206 is to decode the composite video signal into the appropriate RGB signals to be provided to the color electron driver 210. The function of the deflection unit 204 is to decode the synchronization signals embedded in the composite video signal, which the deflection unit provides to the digital television controller 200 and to the CRT 212. More specifically, when a detectable composite video signal (i.e. analog television signal) is received, the deflection unit extracts the horizontal and vertical synchronization signals 205a,b and passes them to the controller 200. The controller uses the signals to align its video signals with those of the normal display. In the case where the composite video signal is not present, video synchronization is able to be provided by the controller itself by reconfiguring the synchronization signal pins of the controller 200 to be outputs and feeding these outputs to the deflection unit 204, which then controls the display 212.

OSD characters are generated within the digital television controller 200. In order to display characters generated by the digital television controller (DTC) 200, a video multiplexer 208 is provided which enables the CRT display's RGB signals and synchronization to be controlled by the video outputs 207a, 207b from the controller 200. When the controller 200 needs to display a character on the screen, the multiplexer 208 is switched and the DTC controller's video signals appear on the display. The BLANK signal 207b provided by the controller 200 controls the output of the multiplexor 208. Thus, when there are no OSD characters to be displayed, BLANK signal 207b will configure multiplexor 208 to output the RGB signals provided by the color decoder 206. However, when OSD characters are to be displayed, the multiplexor 208 is switched by the BLANK signal 207b to allow the controller's RGB signals 207a to be superimposed over a portion of the RGB signals provided by the color decoder 206. The output of the multiplexor 208 is fed into the color electron gun driver 210 which controls the positioning of the electron beam of the CRT 212, thereby producing a video image on the screen.

FIG. 3 is a functional block diagram of the digital television controller 200 of FIG. 2. The OSD circuitry of the digital television controller 200 is represented by block 250. Shown within the OSD circuitry block 250 is the microcontroller 400, which comprises a CPU 450 and video RAM (VRAM) 414. Also, shown is OSD signal generator block 375, internal ROM block 500, and character expansion block 350. The circuitry of OSD block 250 is illustrated in greater detail in FIG. 4.

FIG. 4 is a block diagram of the OSD circuitry of block 250 of FIG. 3, and illustrates the hardware architecture of the present invention.

The circuit of FIG. 4 comprises at least one address bus 301; an internal data bus 303; an external bus 305; a microprocessor 400 including video RAM 414; an internal ROM circuit 500; a plurality of data storage registers such as, for example, CG ROM capture register 304 and registers 406, 408, 410 (FIG. 5A) within the microcontroller 400; a plurality of shift registers 602, 604, 606 (FIG. 9) located in OSD block 600; a bus multiplexer 310; and a plurality of buffers 310a, 310b, 310c, 312, 314, 316, 318, and 320. Note that in a different embodiment of the present invention, a second plurality of data storage registers could be used in place of the plurality of buffers described above.

It should also be noted that, as used in this description, the terms "OSD controller" and "OSD logic circuit" both refer to the on-screen display logic circuitry 250 of FIG. 4.

A brief overview of the various components of FIG. 4 will now be described. Microprocessor 400 is used to implement programming instructions stored within the internal ROM block 500. These programming instructions include both OSD and non-OSD processing tasks. Examples of OSD related processing tasks which are required to be performed by the microprocessor 400 include: loading character data into VRAM 414, retrieving character data from VRAM 414, addressing the CG ROM 504 (FIG. 5B), determining the expansion ratio of the character to be displayed (discussed below), storing video data from character expansion block 350 into the microprocessor's internal registers, and retrieving video data from the microprocessor's internal registers and loading the data into buffers 316, 318 and 320.

Buffers 312 and 314 are also used by the microprocessor to store video data retrieved from the microprocessor's RAM. The data within buffers 312 and 314 are used to address a character generator ROM (CG ROM 504—located within internal ROM block 500) to cause the CG ROM to output a pixel representation of the character to be displayed. CG ROM capture register 304 latches the pixel data provided by CG ROM, and makes this data available to multiplexer 310. Multiplexer 310 is used to expand or enlarge the character to be displayed, and is described in detail below in the section entitled, "Character Multiplier Circuitry". The output of the multiplexer 310 is made available to the microprocessor via buffers 310a–c. The multiplexed data is then stored within the microprocessor's RAM.

After all the necessary video data has been multiplexed and stored within the microprocessor's RAM, the microprocessor then transfers the video data from its RAM into the appropriate buffers 316, 318, and 320, where the data will be latched into OSD block 600 and converted into the appropriate RGB/BLANK signals. Buffer 316 is used to store video data relating to the current line of the character to be displayed on the screen. Buffer 317 is used to store video data relating to the next line of the character to be displayed. This next line data is needed for smoothing the appearance of an expanded character, which is discussed in greater detail below. Lastly, buffer 320 is used to store attribute data relating to the character to be displayed, such as character color, foreground and background colors, character position offset delay, and background transparency. The character video data provided to buffers 316, 318, and 320 is latched into OSD block 600, whereupon the current data to be displayed is modified, if desired, to include a host of display attributes, including underlining, italics, blinking, smoothing and fringing. The modified data is then converted into appropriate RGB/BLANK signals and output to a color electron gun driver.

The new OSD architecture of the present invention utilizes a RISC based microprocessor 400. An example of such a microprocessor is the Z89C00 RISC processor manufactured by Zilog, Inc., of Campbell, Calif. This processor allows the user to control the on-board peripheral functions and registers using a standard processor instruction set. The Z89C00 processor is optimized for data processing and transfer. Peripheral registers 16 bits wide, for example, are programmed to control the operation of the peripheral devices. Two banks of 256 words each of RAM in the processor can be used for video character sequence storage, as discussed in greater detail below.

The advantage of using a RISC based microprocessor is that the maximum number of clock cycles consumed by the longest instruction of its instruction set is typically much shorter than the maximum number of clock cycles consumed by the longest instruction of the instruction set of a CISC based microprocessor. For example, the maximum length of any instruction within the Z89C00 microprocessor is 3 clock cycles, whereas typical CISC based microprocessors can have instructions consuming 15 clock cycles or more.

The particular reason as to why it is desirable to utilize a microprocessor which has relatively short instructions has to do with the synchronization between the OSD circuitry of the present invention and the electron gun driver 210. This is discussed in greater detail below in the section entitled "Synchronization of OSD Circuitry".

Although a preferred implementation of the present invention utilizes a RISC based processor, a different embodiment utilizing other microprocessors, such as those based on CISC technology, would be readily apparent to those skilled in the art in light of this disclosure. These other embodiments are intended to be included within the scope of this invention.

FIG. 5A illustrates an example of the mapping of the various registers, counters and pointers included within the RAM of the microcontroller 400. As shown in FIG. 5A, the microcontroller 400 comprises a column counter 402 for keeping track of information relating to the number of characters to be displayed on the screen 212; a row address counter 404 for keeping track of information relating to the number of rows of the character pixel array to be displayed; registers 406, 408, and 410 used for storage and retrieval of video data; a plurality of pointers 412; and video RAM 414.

Video RAM 414 comprises a full customizable character set which can be displayed with a host of display attributes, including underlining, italics, and blinking, foreground and background colors, character position offset delay, and background transparency. In the example where the Z89C00 RISC processor is used, the video RAM 414 comprises a 512-character character set formatted in two 256 character banks. Each character within the video RAM (VRAM) is represented by a 16-bit word defining the character type and its key attributes. Each word representing a particular character within the VRAM refers to a specific location within the CG ROM wherein that particular character's pixel array is stored, for example, as a 16 or 18 word representation. Each word within the VRAM specifies a single display character and basic character attributes, allowing modification of attributes on a character-by-character basis in the character control mode. The insertion of control characters allows further control of other character attributes.

FIG. 5B illustrates the contents of the internal ROM block 500 of FIG. 4. As shown in FIG. 5B, the contents of internal ROM 500 are divided into a first section comprising the program code ROM 502, and another section comprising the character generator ROM (CG ROM) 504.

The program code ROM 502 typically comprises all of the software code necessary for instructing the microcontroller 400 to perform the various processing tasks and functions of the television, including OSD and non-OSD procedures.

The CG ROM 504 comprises a pixel array of every character within the character set of the microcontroller 400, and can be represented, for example, as 16 or 18 words of ROM storage, depending on whether the display is set to 16-by-16 or 16-by-18 pixels. In the example where the Z89C00 RISC processor is used, each word in the CG ROM is 16 bits long. Pixel lines 1 to 16 are mapped sequentially to ROM addresses that are pointed to by a character pointer stored in EXT3 buffer 312 and a line number offset stored in EXT4 buffer 314. The required character graphics ROM size is dependent on the number of characters that are stored in memory. In the example above, a maximum of 256 characters are available to be accessed by the CG ROM.

A detailed explanation of the operation of the OSD circuit 250 illustrated in FIG. 4 will now be described, which should be taken in conjunction with the other aspects of the present invention discussed below.

FIGS. 14 through 18 illustrate, in flow diagram format, the operation of the OSD circuit 250 of FIG. 4. Generally speaking, the operation of the present invention can be divided into two modes: a non-OSD processing mode, and an OSD processing mode. During the non-OSD processing mode, the microcontroller performs various processing tasks which are typically not related to the OSD process such as, for example, volume up/down. The flow diagram for the non-OSD processing mode is represented in FIG. 14 by process steps 702, 724, and 730. According to these steps, the microprocessor continually checks for receipt of either an HSYNC interrupt signal or a VSYNC signal. In the absence of either of these signals being received, the microprocessor performs processing tasks which are typically unrelated to the OSD operation. However, such processing tasks can include loading the current characters to be displayed into video RAM 414. FIG. 4 can be used to illustrate the data and address paths during non-OSD operations. Instructions for the microcontroller 400 are provided by the program code ROM 502 located within the internal ROM block 500. During the non-OSD mode, processing instructions are typically passed from the internal ROM block 500 to the microprocessor 400, whereupon the microprocessor then executes the instruction it has received. After executing the current instruction, the microprocessor loads the address for the next instruction on bus 301 and fetches the next instruction from the internal ROM 500.

If, at any time during this processing loop the microprocessor receives a VSYNC signal, it will finish its current processing instruction and then reset the row and column counters 402 and 404. After the row and column counters have been reset, the microprocessor continues performing other processing tasks. This is illustrated in FIG. 14 by process steps 724, 726 and 730.

If at any time the microprocessor receives an HSYNC interrupt signal, the microprocessor will complete its current processing task and then enter the OSD processing mode, beginning with step 704 of FIG. 14.

During the OSD processing mode, the microcontroller and the other circuits of FIG. 4 cooperate with each other to display characters on the color tube 212. Initially, the OSD processing mode is entered when the microprocessor 400 receives an initial OSD interrupt signal which causes the microprocessor to commence with OSD operations. In the preferred embodiment of the present invention, the OSD interrupt signal which causes the microprocessor 400 to enter the OSD processing mode is the HSYNC interrupt signal 205*a*. The HSYNC interrupt signal is typically provided by a source such as the deflection unit 204 (FIG. 2), discussed earlier in this section.

The first step performed by the OSD circuitry 250 is to switch the clock signal CLK supplied to each of the components of the OSD circuitry 250 from the SYSCLK signal source to the DOTCLK signal source. The rationale for switching the clock signal source has to do with synchronizing the OSD circuitry with the color electron gun driver, and is discussed in detail in the section below entitled "Synchronization of OSD Circuitry".

Once the clock signal source has been switched, the microcontroller 400 performs a variety of pre-OSD processing tasks such as loading the column counter 402 with a number representing the total number of characters in the phrase to be displayed on the screen (step 706); defining the current character to be displayed (step 708); defining the current row and next row of the pixel representation of the characters to be displayed (step 710); defining the character expansion ratio (x1, x2 or x3) and setting the EXT4 FLAG (step 712); defining the horizontal and vertical spacing between adjacent characters (step 714); and defining the ITALIC SHIFT delay and loading the ITALIC SHIFT data into the EXT4 buffer (step 716).

Once the microprocessor 400 has performed these pre-OSD tasks, it then performs the main OSD processing tasks which are generally described in FIGS. 15–18. The first step 750 of the main OSD processing subroutine is for the microprocessor 400 to fetch the code of the current character from video RAM 414 located within the microprocessor. The VRAM address defining the character type and its key attributes is placed into the EXT3 buffer(or character register) and fed to the CG ROM 504 located within internal ROM block 500. A binary representation of the current row (or current line) of the character to be displayed is then output from the CG ROM and latched into the CG ROM capture register 304. The contents of this register will comprise a sequence of bits that represent the pixels on the pixel line currently being accessed for that character, and will show whether each pixel is on or off. This sequence of bits is referred to as a binary representation.

As defined in this application and in the appended claims, the word "binary representation" refers to the binary word representing a particular pixel line (or row) of the pixel array within the CG ROM which represents a particular character to be displayed. The binary representation within the CG ROM capture register 304 may then be modified by the bus multiplexer 310 to be expanded by a factor of 1, 2 or 3 times the normal character size by duplicating each bit in the binary word and expanding the representation to the appropriate number of character multiplier registers (or buffers) 310*a*, 310*b*, 310*c*. The value of the character expansion ratio (or character multiplier) is partially determined by the value of the EXT4 FLAG 309, and partially determined by the particular software subroutine which is controlling the microprocessor 400.

It is to be noted that although the particular embodiment described above is able to expand characters by a factor of 1, 2 or 3 times their normal size, other embodiments of the present invention which are able to expand characters to n times their normal size would be readily apparent to those skilled in the art in light of this disclosure, and therefore need not be discussed further in the application.

Depending on the value of the character expansion ratio of step 756, the sequence of subsequent processing steps branches into one of three separate paths. The first path corresponds to a character expansion ratio of x1. The second path corresponds to an expansion ratio of x2, and the third path corresponds to an expansion ratio of x3. Each path of subsequent procedural steps slightly differs from each other path since the amount of video data to be manipulated by the microprocessor varies with the value of the expansion ratio.

For purposes of illustration, it will be assumed that the value of the character expansion ratio is x2. The process by which the bus multiplexer 310 expands the information contained within the CG ROM capture register 304 is described in detail below in the section entitled "Character Multiplier Circuitry".

Given that the character expansion ratio is x2, the bus multiplexer 310 will duplicate each bit comprising the 16 bit word within the CG ROM capture register 304, thereby producing a 32 bit word. The 16 most significant bits (referred to as the "high chunk") of the 32 bit word are stored in buffer 310*a*. The 16 least most significant bits (referred to as the "low chunk") of the 32 bit word are stored in buffer 310*b*. The high and low chunks of the expanded 32 bit binary representation are then loaded from buffers 310*a* and 310*b* into the current data registers 408 within the microprocessor 400.

Next, the microprocessor fetches the binary representation of the next line of the character pixel array from CG ROM 504. The next line data is needed in order to determine the smoothing characteristics of the expanded data word which will be displayed on the screen. The precise process as to how this next line data is utilized by the smoothing logic block 608 within OSD block 600 is known to those skilled in the art and therefore, will not be discussed further in the present application.

It should be noted that the next line data is not needed in the processing sequence where the character has not been expanded (i.e. where the expansion ratio is x1). This is because there is no smoothing to be performed on a normal sized character. Thus, although the video character data for the unexpanded character is passed through smoothing and fringing logic block 608 (FIG. 9), no actual smoothing is added to the video data. However, in processing steps where the character is to be expanded by a factor of two or three, the next line data of the character is needed in order to perform the smoothing operations within the OSD block 600.

The processing of fetching the next line of character data is essentially the same as the process described above for fetching the current line of character data. The microprocessor addresses the CG ROM to output the binary representation of the next line of the pixel array of the current character. The next line binary representation is then latched into the CG ROM capture register 304 and multiplexed by multiplexer 310 in the same manner as the current line binary representation. In the present example, an expansion ratio of x2 is used, and therefore the binary representation of the next line will be multiplexed into a 32 bit word, where the high chunk of the word will be stored in buffer 310*a* and the low chunk of the word will be stored in buffer 310*b*. The high and low chunks of the expanded 32 bit binary representation of the next line are then stored within the NXT/PRV data registers 410 within the microprocessor 400. Next, the microprocessor fetches the attribute data for the current character from video RAM 414 and loads the data into the attribute register 406 within the microprocessor.

After the current line, next line, and attribute data have been loaded into the appropriate registers within the CPU, the contents of each of these registers are then transferred to the OSD block 600. Specifically, as depicted in steps 832 to 835 of FIG. 15, the high chunk of the binary representation of the current line is loaded from the CPU RAM into the current data buffer 316 and latched into the current line shift register 602 (FIG. 9). Next, the high chunk of the binary representation of the next line is loaded from the CPU RAM into the NXT/PRV data buffer 318 and latched into the next/previous line shift register 604. Lastly, the attribute data is loaded from the CPU RAM into the ATTR data buffer and latched into the attribute register 606.

As depicted in FIG. 17, once the video data has been latched into the OSD block 600, the microprocessor is free to perform other OSD processing steps (beginning with step 836) while the OSD block 600 executes its own sequence of steps 800 on the video data contained therein. The steps performed by the OSD block sequence 800 are the same regardless of the desired expansion ratio of the character to be displayed.

FIG. 9 is a block diagram illustrating the contents of the OSD block 600 of FIG. 4. The binary data contained within shift registers 602 and 604 are serially shifted into the smoothing and fringing block 608. Delay (DFF) block 622 delays the data output from shift register 602. This is necessary since the smoothing and fringing logic block 608 needs to receive data from shift registers 602 and 604 at the same time. Specifically, delay block 622 compensates for the time differential which results from first loading the current line video data into shift register 602 and then loading the next/previous line video data into shift register 604. Since each shift register continually and serially shifts data to smoothing and logic block 608, the delay in loading the next line data would result in a mismatch of data received at the smoothing and fringing logic block 608, which would defeat the utility of the smoothing function. The delay block 622 compensates for this mismatch by delaying the transmission of the current line data by exactly the same length of time that it takes to load the next line data into shift register 604. Using the RISC microprocessor of the preferred embodiment, the delay in transferring the next line data into shift register 604 is approximately one DOTCLK cycle.

The smoothing logic within block 608 smoothes out and improves the appearance of larger fonts. The fringing circuitry within block 608 can be activated to improve the visibility of text by surrounding the character lines with a one pixel boarder. The processes which are performed by the smoothing and fringing logic block 608 are commonly known to those skilled in the art and are described in the *Digital Television Controller Users Manual*. Therefore, these topics will not be discussed further in this application.

Once smoothing and fringing have been added to the current data line, the smoothed data word is separated from the fringing data, and each is passed to a respective demultiplexer 616, 618 wherein the italic shift data 307 is incorporated into the smoothed video data 612 and the fringed blank signal 614. Exactly how the italic shift data is incorporated into the current line character data is generally known to those skilled in the art and will not be discussed further in this application.

Simultaneously, while the current line data is being manipulated, the attribute data in register 606 is passed to logic block 610 which decodes the attribute data to determine a host of display attributes such as, for example, foreground and background colors, character position offset delay, and background transparency.

The smoothed video data and fringed blank signal, together with their italic shift data incorporated into them are serially transferred into the RGB multiplexer logic block 620. Here the attribute data is incorporated into the current line data, whereupon the appropriate RGB signal 207*a* or BLANK signal 207*b* is output to the color electron gun driver 210.

As described previously, OSD block 600 functions independently from the microprocessor 400 and other parts of the OSD controller 250. It is for this reason that the microprocessor is able to perform other OSD or non-OSD processing tasks while OSD block 600 is manipulating the current line data to provide the appropriate RGB/BLANK signals to the color electron driver 210. In the particular embodiment described herein, OSD block 600 continually outputs both an RGB signal 207*a* and a BLANK signal 207*b* to the color electron gun driver 210. The BLANK signal 207*b* prevents RGB signals 207*a* from interfering with the video picture displayed to the viewer since the BLANK signal 207*b* drives multiplexer 208 (FIG. 2), and therefore controls the superimposing of any OSD generated signals over the existing television video signal.

It should be noted that since each of the shift registers 602 and 604 are 16 bits wide, it takes 16 clock cycles to empty each of the shift registers. This means that the microprocessor 400 has 16 clock cycles in which to fetch and process the video data corresponding to the next line of information to be displayed so that the data is ready to be loaded into the appropriate shift registers 602 and 604 at the end of the 16th clock cycle. This process is described in greater detail immediately below.

Referring back to the example above, while OSD block 600 is executing OSD block sequence 800, the microprocessor is simultaneously fetching the low chunk data relating to the binary representation of the current and next lines from the CPU RAM and loading this data into the respective current and next data buffers 316, 318. Additionally, the attribute data is retrieved from the RAM within the microprocessor and loaded into the attribute data buffer 320. The video data contained in buffers 316, 318 and 320 will be latched into the appropriate shift registers of the OSD block 600 exactly when a predetermined amount of time has elapsed, said predetermined amount of time being equal to the length of time it takes to completely empty out shift registers 602 and 604.

In the preferred embodiment described herein, the predetermined amount of time is equal to 16 DOTCLK cycles as measured from the initial latching of data into shift register 602 and 604. As described previously, the 16 DOTCLK cycles figure is derived from the fact that each of the shift registers 602 and 604 are each 16 bits wide and serially shift data one bit at a time with the occurrence of each clock pulse, thereby requiring 16 clock cycles to completely empty out each of the shift registers.

After the data relating to the low chunk of the current character has been transferred into OSD block 600, the CPU checks to see if any more characters are needed to be displayed, since the current line of the next character must be displayed before the next line of the current character is displayed. The information relating to the number of characters to be displayed is located within the column counter 402 of the microprocessor 400. If there are additional characters which need to be displayed, the next character is assigned as the current character, and the processing sequence goes back to the start of the OSD subroutine which begins at step 750 of FIG. 15.

If there are no more characters to be displayed, the microcontroller is instructed to switch the CLK signal from the DOTCLK to the SYSCLK. This switching between different clock signal sources is discussed in detail in the section below entitled "Synchronization of OSD Circuitry". After the CLK signal has been switched, the process is returned to the main subroutine, beginning at step 720 of FIG. 14. At step 720, the microprocessor inquires as to whether the OSD is finished. In other words, the microprocessor inquires as to whether all of the rows of the pixel arrays representing the various characters have been displayed on the screen. The information relating to the number of rows which remain to be displayed is located within row counter 404 of the microprocessor 400. If there are more rows to be displayed, the OSD is not finished, and the microprocessor must prepare for the next line of characters to be displayed. After the microprocessor has prepared for the next line of characters to be displayed, or if there are no more rows to be displayed, the microprocessor performs other processing tasks required by the television controller until another HSYNC interrupt signal is received.

Although the preferred embodiment of the present invention utilizes circuitry to accommodate a 16-bit data word, other embodiments of the present invention based upon a data word of greater than or less than 16 bits would be readily apparent to those skilled in the art in light of this disclosure, and therefore will not be discussed in this application.

In addition, because of the limited instruction set of the RISC based microprocessor, there is no direct path for the transferring of data from the output of the bus multiplexer buffers 310a–c to the OSD block 600. Although the particular embodiment herein described does not provide for such a direct data path, other embodiments of the present invention incorporating such a direct data path would be readily apparent to those skilled in the art in light of this disclosure, and are considered to be within the scope of this invention. In the embodiment where such a direct data path does exist, video data information can be loaded directly from buffers 310a–c into the appropriate registers within OSD block 600, with the limitation that there should not be a significant lag time between the latching in of the current line data into shift register 602 and the latching of the next line data into shift register 604 since this may defeat the utility of the smoothing operations, as discussed previously.

Character Multiplier Circuitry

FIGS. 6 and 7A–D illustrate how video data is expanded as it is passed through the character expansion circuitry 350 of FIG. 4. Generally speaking, the character expansion circuitry 350 can be controlled to double or triple the size of the pixel line (or binary representation) presented to it from the CG ROM capture register 304. The character expansion circuitry 350 does not perform a numerical multiplication. Rather, the bits of the binary word contained in the capture register 304 are duplicated to enlarge the character as it would be displayed horizontally on the screen. Thus, the expansion of the displayed characters is achieved without slowing down or otherwise modifying the frequency of the DOT clock. The advantage of not having to alter the frequency of the DOT clock is that the present invention is able to mix and overlap characters of different sizes on the display screen. Conventional OSD systems are not able to do this. In addition, by retaining the same DOT clock rate for different size characters, the resolution of the OSD characters generated by the present invention is increased.

FIG. 6 illustrates the example where a 16 bit binary word is passed through the character expansion circuitry 350. As the 16 bit word leaves the CG ROM capture register 304, it is passed through the bus multiplexer 310. The output of the bus multiplexer depends upon the value of the EXT4 FLAG 309, which partially determines the expansion ratio (x1, x2, or x3) of the character to be displayed. If the value of the EXT4 FLAG 309 is a first value which indicates that the character is to be expanded by a factor of 3, the bus multiplexer will triplicate each of the bits and the data word, thereby producing a data word which is 48 bits wide. The first 16 most significant bits, defined in this application and in the appended claims as the "high chunk", are placed into buffer 310a. The next 16 bits of highest significance, defined in this application and in the appended claims as the "mid chunk", are placed into buffer 310b. The least significant 16 bits, defined in this application and in the appended claims as the "low chunk", are placed into buffer 310c. A practical illustration of the x3 character expansion is shown in FIG. 7B using an actual 16 bit data word. The resultant pixel representation is illustrated in FIG. 7D.

If, however, the EXT4 FLAG 309 is a second value which indicates that the character is to be expanded by a factor of either 1 or 2, the binary word passing through the bus multiplexer 310 will be duplicated producing an expanded data word which is 32 bits wide. The high chunk of the data word will be placed into buffer 310a, and the low chunk of the data word will be placed into buffer 310b. During the same process, the original 16 bit data word will be placed into buffer 310c. From that point, whether the present invention chooses to use the data from buffers 310a and b (i.e. expansion factor of x2) or the data from buffer 310c (expansion factor of x1) is a function of the particular software subroutine controlling the microprocessor at that time. An illustration of the x1 and x2 expansion process it is depicted in FIG. 7A using an actual 16 bit data word. FIG. 7C illustrates the pixel representation of the same binary data word being expanded by a factor of 2.

FIG. 8 is a schematic diagram of one embodiment of the bus multiplexer 310 of FIG. 6 where the binary input word is to be expanded by a factor of both x1 and x2. As illustrated in FIG. 8, each bank of buffers corresponds to a particular buffer block 310a, 310b, 310c of FIG. 6. Each of the enable lines shown in FIG. 8 is connected on the other end to the microprocessor 400, which enables the microprocessor to determine which information is to be loaded onto the external bus 305.

Synchronization of OSD Circuitry

In conventional OSD controllers (for example, the Z89C27 processor manufactured by Zilog, Inc. of Campbell, Calif.) positioning of the OSD on screen of the television is defined by a set of counters. These counters control when data is to be provided to the output shift register. The counters count either HSYNC pulses (to define vertical positioning of the OSD) or DOTCLK pulses (to define horizontal positioning of the OSD).

Vertical counters are synchronized by VSYNC in order to start generating of the OSD at the same place every television field. Horizontal counters are synchronized by HSYNC. In order to provide exactly the same (identical) timing of the horizontal counter in each television line, the DOTCLK signal is generated by a "ring" oscillator (which is switched off during HSYNC pulses).

Exactly the same effect of generating "identical" lines of OSD can be achieved in the present invention by implementing those horizontal and vertical counters in software. The vertical counter can be implemented as a general purpose register which is incremented upon each HSYNC interrupt. The horizontal counter can be implemented as a continuous software loop where the number of DOT clock (DOTCLK) cycles is carefully calculated and exactly equal to the number of pixels within one character. Over the time of the loop, the microcontroller provides the new data to be loaded into a shift register.

The software driven OSD (with vertical and horizontal counters implemented in software) provides significant flexibility of the generated OSD and allows it to display characters of different size on one line without adding complex specialized hardware.

As discussed in the background of the invention, one common problem associated with character OSD is the synchronization between the OSD circuits and the electron gun which uses the video data from the OSD circuitry to project characters on the color tube. The synchronization of the OSD circuitry with the electron gun driver is needed to prevent the character display from appearing to shake or jitter or otherwise be unstable.

Conventional OSD systems resolved this synchronization problem by connecting the OSD circuitry to a DOT clock which has a frequency equal to the pixel rate of the color tube (i.e. the rate at which the electron beam scans across each pixel in the color tube). By utilizing the DOT clock to synchronize the OSD circuitry with the electron gun driver, the microprocessor of conventional OSD systems is able to be driven by a different, system clock (SYSCLK) frequency, since the microprocessor's role in the OSD process of conventional OSD systems is limited solely to loading character data into the VRAM.

However, the microprocessor 400 of the present invention plays a much more active role in the OSD process than have traditionally been performed by microprocessors in conventional OSD systems. In the present invention, the microprocessor is not only responsible for loading character data into the VRAM, but is also responsible for, among other things, retrieving data from the video RAM, addressing the CG ROM, storing the data provided by buffers 310a–c into its internal registers, and loading the data from its internal registers into the shift registers of the OSD block 600. It is critical that the microprocessor load the video data into the OSD block 600 at the proper time to ensure that the character displayed is stable and does not jitter. Therefore, unlike conventional OSD systems, it is essential that the microprocessor 400 of the present invention be synchronized with the other circuits of OSD logic block 350, and particularly with OSD shift register block 600.

In order to resolve this synchronization problem, the present invention ties each component of the OSD circuitry 250, including the microprocessor 400, to a common clock signal CLK which is switchable between the SYSCLK signal and the DOTCLK signal. The provision of the switchable common clock signal CLK is accomplished through the use as a clock switching device, discussed in greater detail below. The clock switching device ensures that the microprocessor 400 will be in sync with the OSD block 600 since both are driven by the same clock source CLK. 110.

Despite the common clock signal CLK being provided to each of the components within the OSD circuitry 250, there is an additional synchronization problem which must be handled in order to prevent jitter of the on-screen display character. As described previously, the microprocessor 400 enters the OSD processing operation when it receives an HSYNC interrupt signal 205a. Usually, after the OSD interrupt service routine is finished, the microprocessor 400 returns to a main loop where it continuously performs non-OSD related tasks. In the example where the Z89C00 RISC processor is used, each instruction of the microprocessor takes 1, 2 or 3 clock cycles to complete. However, it is unpredictable whether the microprocessor will be starting a new instruction or will be in the middle of an instruction by the time of the next HSYNC interrupt. If the microprocessor is in the middle of an instruction when the HSYNC interrupt signal is received, the processor will have to wait for 1 or 2 clock cycles until the current instruction is completed. This unpredictable delay (0 or 1 or 2 cycles) causes jitter in the OSD display of characters since the character displayed is shifted to the right or left (depending on the delay of the microprocessor) as the characters on the display screen are constantly refreshed.

In order to eliminate the jitter, a HALT signal is provided to the microprocessor 400 for a sufficient amount of time to allow the microprocessor to finish its current instruction, while prohibiting it from starting the execution of a next instruction. The amount of time for applying the HALT signal should be sufficient to ensure that the microprocessor has completed its current processing instruction. Therefore, this amount of time should be equal to or greater than a maximum number of clock cycles consumed by the longest instruction of the instruction set of the microprocessor 400. Only after the current instruction has been executed, but while the microprocessor is still halted, should the HSYNC interrupt signal be asserted to the microprocessor. Then, after the microprocessor has been released from the HALT signal, it will immediately begin the execution of the OSD interrupt service routine, and the synchronization of the OSD will be achieved.

To accomplish the various aspects of synchronization discussed above, the present invention incorporates a clock and signal timing logic circuit 150, which is illustrated in FIG. 12. The clock and signal timing logic circuit 150 is located within the DTC controller 200 (FIG. 2). More specifically, although not shown, logic circuit 150 and the SYSCLK and DOTCLK oscillators 102, 104 are located within control block 370 (FIG. 3) of the DTC controller 200. The circuit 150 of FIG. 12 incorporates two different aspects for providing synchronization of the OSD circuitry 250 (FIG. 4). The first aspect is the microprocessor synchronization device illustrated in FIG. 13A as block 420. The second aspect is a clock switching device illustrated in FIG. 13B as block 106.

FIG. 13A illustrates the hardware necessary to implement the HALT signal and the delayed HSYNC signal. In conventional OSD systems, a microprocessor such as that shown in FIG. 11 directly receives the HSYNC interrupt signal provided by the deflection unit of the television system. However, as shown in FIG. 13A, the present invention incorporates a timing logic block 420 which receives the initial HSYNC interrupt signal 205a provided by the television's deflection unit. The timing logic block 420 then provides a HALT signal 213 to the microcontroller 400.

After a sufficient amount of time has passed to ensure that the microprocessor has completed its current operations, but before the HALT signal has been lifted, the HSYNC interrupt signal is then provided to the microprocessor, which is depicted as HSYNC INT1 215 of FIG. 13A. The timing logic block 420 works in conjunction with the clock switching device 106 of FIG. 13B, described below.

As shown in FIG. 13B, the clock switching device 106 is connected to receive a first clock signal (SYSCLK 102) and a second clock signal (DOTCLK 104). The switching device 106 is responsive to at least one control signal for providing an output clock signal (CLK 110) which is switchable between the SYSCLK and DOTCLK signals. In the embodiment shown in FIG. 13B, the HSYNC interrupt signal 103 causes the switching device to output the DOTCLK signal 104. A separate CONTROL signal 105 provided by the microprocessor causes the switching device to output the SYSCLK signal 102. When the appropriate control signal is received by the switching device 106, the switching device momentarily delays switching between the two clock signals in order the allow current processing operations to be completed without interrupting the clock signals to those operations.

Together, the timing logic block 420 of FIG. 13A and the clock switching device 106 of FIG. 13B comprise the clock and signal timing logic block 150 of FIG. 12. The operation of the clock and signal timing logic circuit of FIG. 12 is illustrated by way of timing diagrams depicted in FIGS. 10A–10E.

Initially, as shown in FIG. 10A, the output of the clock switching device CLK is the SYSCLK signal 102, as shown by the clock signals labeled SYSCLK. When the HSYNC interrupt signal is received at 151 (FIG. 10C), a HALT signal 213 is provided at 153 (FIG. 10B) to the microcontroller. The HALT signal is sufficiently long to enable the microprocessor to finish its current processing instruction, examples of which are illustrated in FIG. 10E. The clock switching device delays switching from the SYSCLK signal 102 to the DOTCLK signal 104 until the microcontroller has completed its current instruction. The switching of the CLK signal source occurs at 163 of FIG. 10A. At this point, the output of the clock switching device CLK is the DOTCLK signal 104 and is represented by the clock signals which are labeled DOTCLK. Then, after an additional amount of time has elapsed to ensure that the clock signal source has been properly switched, an HSYNC INT1 signal is provided at 157 (FIG. 10D) to the microprocessor shortly before the HALT signal is released at 159 (FIG. 10B). Thereafter, at the occurrence of the next CLK cycle 161 (FIG. 10A), the microprocessor will begin execution of the OSD interrupt service routine as illustrated in FIG. 10E.

Although several preferred embodiments of this invention have been described in detail herein with reference to the accompanying drawings, it is to be understood that the invention is not limited to these precise embodiments, and that various changes and modifications may be affected varying by one skilled in the art without departing from the scope or spirit of the invention as defined in the appended claims.

It is claimed:

1. A method for generating a video character in an on screen display system, said character being suitable for display on a video image display screen, said system including a microprocessor having a clock input, said system further including a plurality of logic circuits in communication with said microprocessor, said plurality of logic circuits including a character generator ROM for producing display pixels representing video characters to be displayed, a plurality of data storage registers, and a video pattern generator circuit for converting video data into a format compatible for use with said video image display screen, said method comprising the steps of:

(a) retrieving from the character generator ROM display pixels representing the character to be displayed, and (b) utilizing said microprocessor to control transfer of said retrieved display pixels from the character generator ROM to said pattern generator circuit, said utilizing step including the steps of storing at least a portion of said retrieved display pixels in the microprocessor, and providing said stored display pixels from the microprocessor to the pattern generator circuit to thereby enable said character to be displayed on the display screen.

2. A method for generating a video character in an on screen display system, said character being suitable for display on a video image display screen, said system including a microprocessor having a clock input, said system further including a plurality of logic circuits in communication with said microprocessor, said plurality of logic circuits including a character generator ROM, a plurality of data storage registers, and a video pattern generator circuit for converting video data into a format compatible for use with said video image display screen, said method comprising the steps of:

(a) retrieving video data related to said character from the character generator ROM;

(b) storing said retrieved video data in the microprocessor; and (c) writing said stored video data from said microprocessor to the video pattern generator circuit to thereby enable said character to be displayed on said display screen.

3. A method for generating a video character in an on screen display system, said character being suitable for display on a video image display screen, said system including a microprocessor having a clock input, said system further including a plurality of logic circuits in communication with said microprocessor, said plurality of logic circuits including a character generator ROM, a plurality of data storage registers, and a video pattern generator circuit for converting video data into a format compatible for use with said video image display screen, said method comprising the steps of:

(a) operating the microprocessor in a normal mode at a first frequency by applying a first clock signal to the clock input;

(b) switching the microprocessor into an on screen display (OSD) mode to enable the microprocessor to be used to display said character on said display screen, wherein the microprocessor operates at a second frequency determined by applying a second clock signal to the clock input, said switching step including the step of switching the microprocessor's clock input from said first clock signal to said second clock signal;

(c) temporarily interrupting operation of the microprocessor simultaneously while the clock signal to the microprocessor is being switched, said microprocessor interrupting step including the step of suspending execution of a next microprocessor instruction; and (d) synchronizing operation of the microprocessor with a horizontal OSD synchronization signal in order to ensure that the display of said character is devoid of jitter effects, said synchronizing step including the step of maintaining the interruption of the microprocessor's operation during switching of the microprocessor's clock signal and during a sufficient amount of time thereafter to ensure that the microprocessor is not in the process of executing a current instruction when the microprocessor receives said horizontal OSD synchronization signal.

4. The method of claim 3 wherein said sufficient amount of time is equal to or greater than a maximum number of clock cycles consumed by a longest instruction of an instruction set of said microprocessor.

5. The method of claim 3 wherein said horizontal OSD synchronization signal is asynchronous with said first clock signal.

6. The method of claim 5 wherein said horizontal OSD synchronization signal is further asynchronous with said second clock signal.

7. A method for generating a video character in an on screen display system, said character being suitable for display on a video image display screen, said system comprising a microprocessor and a plurality of logic circuits each connected to said microprocessor, said plurality of logic circuits including a character generator ROM, a plurality of data storage registers, and a plurality of shift registers, said method comprising the steps of:

(a) providing an output clock signal to said microprocessor and at least some of said plurality of logic circuits, said output clock signal being switchable between two clock signals including a first clock signal having a first frequency, and a second clock signal having a second frequency, (b) operating the microprocessor and said at least some of said plurality of logic circuits at said first frequency, said operating step (b) including the steps of switching said output clock signal to said first clock signal and applying said first clock signal to the microprocessor and said at least some of said plurality of logic circuits;

(c) operating the microprocessor and said at least some of said plurality of logic circuits at said second frequency, said operating step (c) including the steps of switching said output clock signal to said second clock signal without resetting or reinitializing said system, and applying said second clock signal to the microprocessor and said at least some of said plurality of logic circuits; and (d) synchronizing operation of the microprocessor with a horizontal OSD synchronization signal in order to ensure that the display of said character is devoid of jitter effects.

8. The method of claim 7 wherein said first clock signal is asynchronous with said second clock signal.

9. The method of claim 7 wherein said first clock signal is not in phase-lock synchronization with said second clock signal.

10. A method for generating a video character in an on screen display system, said character being adjustable in font size and suitable for display on a video image display screen, said character further being comprised of an array of pixels , said system including a clock signal used for generating said video character, said method comprising the steps of:

(a) fetching an indicator which determines a desired font size of said character, and (b) using at least one bus multiplexer to replicate at least a portion of said pixels without using a modification of said clock signal, wherein said multiplexer using step includes the steps of:

retrieving said array of pixels from a character generator ROM and loading at least a portion of said retrieved pixels into at least one bus multiplexer, and using said at least one bus multiplexer to replicate said at least a portion of said retrieved pixels without using a modification of said clock signals.

11. A method for generating a video character in an on screen display system, said character being adjustable in font size and suitable for display on a video image display screen, said character further being comprised of an array of pixels, said system including a periodic clock signal having a predetermined frequency used for generating said video character, said system further including at least one multiplexer, a plurality of data storage registers, and a plurality of shift registers, said method comprising the steps of:

(a) loading a first binary representation of at least a portion of said array of pixels into one of said plurality of data storage registers, (b) fetching an indicator which determines a desired expansion ratio n of said character, said expansion ratio being related to a font size of said character, (c) generating a second binary representation which represents a portion said character modified according to said desired expansion ration, said second binary representation generating step including the steps of:
using at least one bus multiplexer to duplicate each bit in said first binary representation n−1 times,
organizing each bit in said second binary representation such that each of said first binary bits and its n−1 duplicates form a consecutive group of bits in said second binary representation,
locating each group of bits with respect to each other such that the relative order of significance of each group of bits parallels the relative order of significance of each corresponding bit in said first binary representation from which each of said groups was duplicated, (d) storing said second binary representation in at least one of said plurality of data storage registers.

12. The method of claim 11 further comprising the steps of:

converting said second binary representation into a format compatible for display on said display screen, and
displaying said character in accordance with said desired expansion ratio without using a modification of said predetermined clock signal frequency.

13. A method for generating a video character in an on screen display system, said character suitable for display on a video image display screen, said system including a source for providing a horizontal synchronization (HSYNC) signal to said system, said system further including a microprocessor having a clock input and a timing logic circuit having an input connected to receive said HSYNC signal, said system further including a clock switching device to provide an output clock signal to said microprocessor, said output clock signal being switchable between two clock signals, said two clock signals including a first clock signal and a second clock signal, said method comprising the steps of:

(a) receiving said HSYNC signal at the input of said timing logic circuit, (b) providing a HALT signal to said microprocessor in response to reception of said HSYNC signal to prevent said microprocessor from beginning a next instruction after the microprocessor has completed executing a current instruction, (c) simultaneously during step (b), switching the output clock signal provided to said microprocessor from said first clock signal to said second clock signal, and (d) providing said a delayed HSYNC signal to said microprocessor a sufficient amount of time after issuance of said HALT signal to ensure that the timing of the microprocessor's execution of OSD instructions is such that the character being displayed on the display screen is devoid of jitter effects.

14. The method of claim 13 wherein said first clock signal is asynchronous with said second clock signal.

15. The method of claim 13 wherein said received HSYNC signal is asynchronous with said first clock signal.

16. The method of claim 15 wherein said received HSYNC signal is further asynchronous with said second clock signal.

17. The method of claim 13 wherein said first clock signal is not in phase-lock synchronization with said second clock signal.

18. A system for generating a video character suitable for display on a video image display screen, said system including a source for providing a horizontal synchronization (HSYNC) signal and a vertical synchronization (VSYNC) signal to said system, said system further including a first clock signal source for generating a first clock signal and a second clock signal source for generating a second clock, said system comprising:

a switching device having a first input connected to receive said first clock signal and a second input connected to receive said second clock signal, said switching device being responsive to at least one control signal for providing an output clock signal which is switchable between said first and second clock signals;

a microprocessor having a clock input connected to receive said output clock signal, said microprocessor operating at a clock frequency determined by said output clock signal, wherein said microprocessor is adapted to operate in a normal mode at a first frequency determined by said first clock signal, and is adapted to operate in an on screen display (OSD) mode at a second frequency determined by said second clock signal, and timing logic means for causing said switching device to switch its output clock signal from one of said first and second clock signals to the other of said first and second clock signals, and for temporarily interrupting operation of the microprocessor by suspending execution of subsequent microprocessor instructions simultaneously during the switching of said output clock signal.

19. The system of claim 18 wherein said first clock signal is asynchronous with said second clock signal.

20. The system of claim 18 wherein said timing logic means includes a timing logic circuit having an input connected to receive said HSYNC signal and a first and second output, said first output connected to provide a HALT signal to said microprocessor simultaneously during the switching of said output clock signal to halt said microprocessor after it has completed executing a current instruction, said second output connected to provide said HSYNC signal to said microprocessor a sufficient amount of time after issuance of said HALT signal to ensure that the timing of the microprocessor's execution of OSD instructions is such that the character being displayed on the display screen is devoid of jitter effects.

21. The system of claim 20 wherein said microprocessor further comprises a hard-wired interrupt input pin adapted to receive and immediately detect said HALT signal.

22. The method of claim 18 wherein said first clock signal is not in phase-lock synchronization with said second clock signal.

* * * * *